United States Patent
Kodama et al.

[11] Patent Number: 6,059,648
[45] Date of Patent: May 9, 2000

[54] AUTOMATIC DEBONING METHOD AND APPARATUS FOR UPPER HALF OF POULTRY CARCASS

[75] Inventors: Ryuji Kodama; Hiroyuki Hayakawa; Yasuaki Nomura; Toshikazu Kamae; Shouzou Kouzu, all of Tokyo, Japan

[73] Assignee: Mayekawa Mfg. Co., Ltd., Tokyo, Japan

[21] Appl. No.: 09/234,408

[22] Filed: Jan. 21, 1999

[30] Foreign Application Priority Data

Jan. 21, 1998 [JP] Japan ..................... 10-23799

[51] Int. Cl.[7] .................................. A22C 21/00
[52] U.S. Cl. ........................... 452/135; 452/157
[58] Field of Search ................... 452/157, 135, 452/136, 150, 151, 155

[56] References Cited

U.S. PATENT DOCUMENTS

| | | |
|---|---|---|
| 4,477,942 | 10/1984 | Martin et al. . |
| 4,627,007 | 12/1986 | Muschany ................... 452/157 |
| 4,896,399 | 1/1990 | Hazenbroek ................ 452/157 |
| 5,154,665 | 10/1992 | Hazenbroek ................ 452/157 |
| 5,368,520 | 11/1994 | Koch et al. . |
| 5,466,185 | 11/1995 | Martin . |

FOREIGN PATENT DOCUMENTS

| | | |
|---|---|---|
| 033177 A1 | 1/1981 | European Pat. Off. . |
| 236242 A1 | 2/1987 | European Pat. Off. . |
| 695506 A2 | 2/1996 | European Pat. Off. . |
| 813814 A2 | 12/1997 | European Pat. Off. . |
| WO 97/21352 | 6/1997 | WIPO . |
| WO 98/56254 | 12/1998 | WIPO . |

Primary Examiner—Willis Little
Attorney, Agent, or Firm—Evenson, McKeown, Edwards & Lenahan, P.L.L.C.

[57] ABSTRACT

An automatic deboning method and apparatus are provided whereby, in a deboning process comprising the steps of: severing shoulder joints off from an upper half of a poultry carcass; stripping wings together with breast meat; then removing white meat, and thus deboning is completed, a high recovery rate is secured while coping with individuality of a work, such as a size and imbalance between the left and right sides, in an automatic manner, and the apparatus comprises: a main tact transport section 29 and an auxiliary tact transport section 30 wherein the main tact transport section 29 includes a main tact transport 20 and a group of $1^{st}$ to $12^{th}$ stations.

22 Claims, 16 Drawing Sheets

FIG.5A
FIG.5B
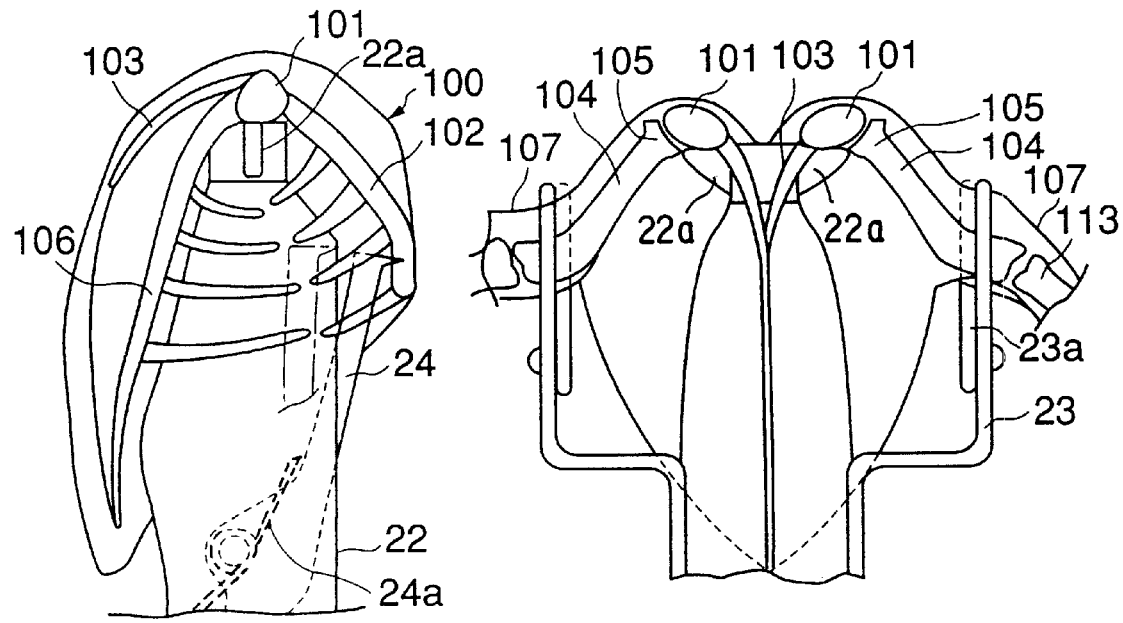
FIG.6
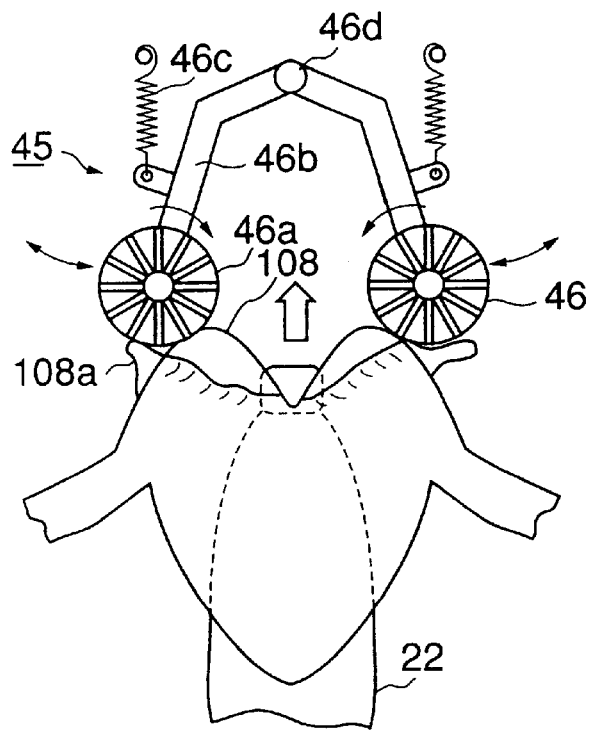

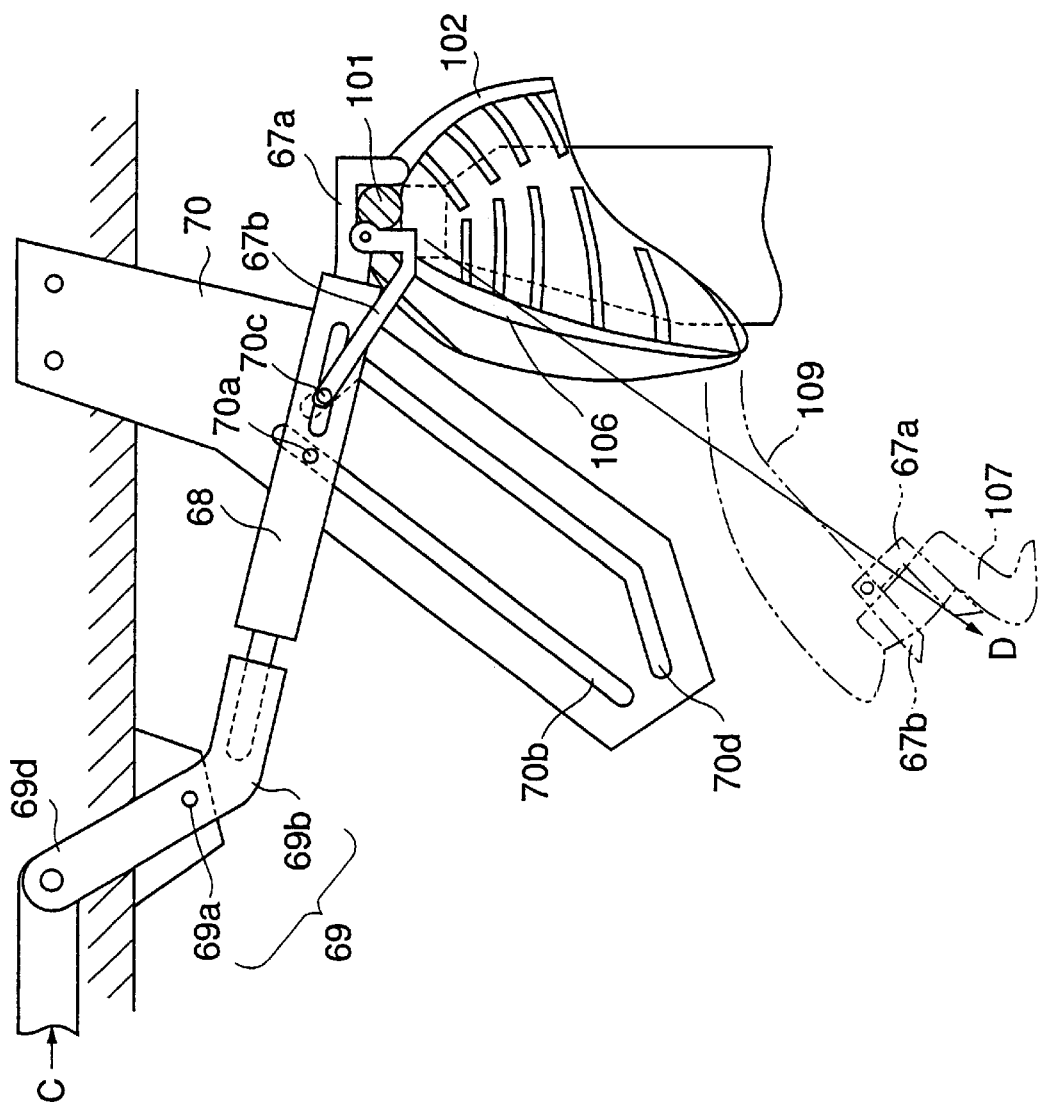

AUTOMATIC DEBONING METHOD AND APPARATUS FOR UPPER HALF OF POULTRY CARCASS

BACKGROUND OF THE INVENTION

1. Field of the Invention

The present invention relates to an automatic deboning method and apparatus for an upper half of a poultry carcass for meat (hereinafter simply referred to as upper half) in which organic tissue such as tendons around a shoulder joint is severed, and breast meat is separated together with wings from a bone and white meat are easily removed from a bone, and particularly, to an automatic deboning method and apparatus for an upper half of a poultry carcass in which an upper half can automatically be deboned without no human hands realizing a high recovery rate in a flexible manner regardless of a size of the upper half.

2. Description of the Prior Art

In recent years, breeding, slaughtering and deboning of carcasses of poultry for meat have been grown to a large scale in the related industry and various types of automation have actually been practiced.

While separation of thigh meat from a carcass of poultry for meat is currently performed by human hands, a deboning method and apparatus suitable for separated thigh meat have been proposed by the same inventors as those of the present invention.

Meanwhile, heretofore, breast meat has also manually been stripped from an upper half which is a remainder after the thigh meat is cut off from the carcass of poultry for meat, but there have still been problems that foreign matter is apt to be mixed into breast meat and white meat is left behind between forked branches of a furcula in a severing process, and in addition, breast meat and white meat are subject to damages in each stripping operation, which devaluates the meats as an article of commerce. A worker performs severing and stripping, necessarily putting a palm and a finger in direct contact with meat, which has lead to other problems that a recovery rate is reduced and a management cost in a hygienic aspect becomes higher.

Therefore, the inventors of the present invention has conducted an analysis on an organic configuration of the upper half of a poultry carcass, considering that reduction in a recovery rate in the conventional deboning means is caused by being fully bound by the conventional way without any understanding of configuration of an organic upper half.

An organic configuration which has been apparent through the analysis is, as seen in perspective views of FIGS. 16, 17, such that muscle of the white meat 112 is connected with humeruses which are respectively combined with the glenoids 101a which the scapula heads 101 contain, while the breast meat 109 is connected with the scapula head 101 through breast muscle, and wings 107 are connected with the scapula head 101 through upper arm muscle, and the breast muscle 109 is formed in a space surrounded by the scapula 102, the upper portion of an os coracoideum 106 and the furcula 103.

As can be seen in FIG. 17, the scapula heads 101 at which the furcula 101, the os coracoideum 106 and the scapula 102 are merged contains the glenoid 101a, a caput humeri, not shown, is fittingly engaged in the glenoid 101a, and the scapula head 101 and the caput humeri forms a shoulder joint, being coupled by a ligament, a tendon, a muscle, a joint envelop and the like.

In the case where breast meat or breast meat together with wings are separated, as shown in FIG. 17, the tendon, the ligament, the muscle, the joint envelop and the like which couple and engage the glenoid 101a of the scapula head 101 and the caput humeri (FIG. 19) with each other in the shoulder joint are cut off as a precondition (hereinafter referred to as shoulder joint line-cutting), and a recovery rate is greatly affected by whether performance of the shoulder joint line-cutting is good or not: that is if the position and depth of the shoulder line-cutting are properly set regardless of a size of the upper half, a good recovery rate is secured.

In order to execute good shoulder joint line-cutting, the insert position, cutting depth and cutting direction of a cutter are required to be properly set in a flexible manner according to a size of the upper half all the time.

A spatial relation between positions of tendons of organic tissue which are an object of the shoulder joint line-cutting operation and a size of an upper half has been studied in a detailed manner based on a skeletal structure, and as a result, the followings have been concluded:

1) That is, in FIGS. 18 (A), (B), (C), the skeletal structure of an upper half is shown in a front elevational view, side elevational view and rear elevational view, when seen from the breast side. In FIGS. 19 (A), (B), enlarged views of encircled portions marked by D and E respectively of FIGS. 18 (B), 18(C) are shown, which are a shoulder joint and its periphery.

The followings can be observed from FIGS. 19 (A), 19 (B):

1-a) The head 101 of the scapula 102 and the caput humeri 105 are coupled with two sets (1), (2) of tendons and thereby the caput humeri 105 is fittingly engaged in the glenoid 101a.

1-b) As seen from the rear elevational view shown in FIG. 9 (B), the set of tendons (1) are positioned outward of the set of tendons (2) and the set of tendons (1) are originated from the scapula head 100 and extended onto the caput humeri 105 outward off to the lower side, while the set of tendons (2) are also originated from the head 101 of the scapula and extended to a position roughly lower than the caput humeri 105, downward, inward and deeper.

The inventors of the present invention has already proposed separation of breast meat which automatically copes with a variety of sizes of upper halves of poultry carcasses, in consideration of an organic configuration of the upper half, structural positions of tendons around a shoulder joint and the like, which has been made clear as described above.

The case of the above proposal relates to a method of shoulder joint line-cutting which copes with sizes of upper halves which would otherwise entail reduction in a recovery rate, wherein a width between shoulder joints and a height thereof are restricted within predetermined dimensions. Hence, such a proposed method is accompanied with unnaturalness, and besides forces to accept troubles caused by stepwise restriction, so that the method could not be said a perfect measure.

SUMMARY OF THE INVENTION

The present invention has been made in light of the above problems and it is, accordingly, an object of the present invention to provide an automatic deboning method and apparatus for an upper half of a poultry carcass by which individuality of an upper half, such as a size of a work, imbalance between the left and right sides of a work and the like are absorbed in a process from feeding an upper half to discharging a skelton therefrom through stripping of breast meat and removal of white meat by a desired deboning process and the whole process can be performed perfectly free of human hands at a high recovery rate.

In order to perform the deboning process, the following steps which are respectively recited in items a), b) and c) are conceivable:

a) feeding and mounting a work, and putting the work into a preliminary process;

b) severing a shoulder joint, stripping breast meat using wings, performing line-cutting in white meat, removing white meat, and discharging a skelton; and c) severing breast meat off from the wings.

The item a) is steps which are those for performing items b and c and it is required that in the steps of the item a), processing in preceding stages is performed with certainty and accuracy in terms of not only a method but an apparatus especially in order to realize unmanned operations at a high recovery rate. In the present invention, a method and apparatus in which emphasis is placed especially on these points are provided.

Accordingly, an aspect of the present invention which is recited in claim 1 is directed to an automatic deboning method for an upper half of a poultry carcass which comprises a series of the steps of: feeding and mounting a work which is an upper half of a poultry carcass; performing a preliminary process on the mounted work; severing a shoulder joint of the work which has been subjected to the preliminary process; then stripping breast meat; subsequently removing white meat; and then discharging a skelton, wherein in the step of feeding/mounting a work, the lower surfaces of scapula heads of shoulder joints of the work are set on a reference horizontal plane and the work is fixed so as to assume a right facing direction;

in the step of preliminary process step, a measuring/storage step for measuring on specific portions of the work in a width direction thereof in order to automatically cope with individuality of the work is provided;

in the step of severing a shoulder joint, a cutter insert position in cutting of outward positioned tendons, leftward/rightward movement positions of both end tips of a caput humeri press plates in cutting of inward positioned tendons, and a horizontal cutter insert position are computed and set based on the measured value;

in the step of stripping breast meat, a step of severing breast is provided for separating the breast meat as a branched step of the breast meat stripping step, and wherein the whole steps constitute a circulation system, in which process flow is automatically returned back to the work feeding/mounting step after the skelton discharging step is completed.

As described above, an automatic deboning method for an upper half of a poultry carcass of the present invention is realized by executing a series of process steps of: mounting a work; a preliminary process; severing the work around a shoulder joint and stripping breast meat; removing white meat, which follows the cutting and severing steps; and discharging a skelton, wherein since, by the mounting the work, the lower surfaces of the heads of scapulas each of which constitutes a shoulder joint in cooperation with a humerus which fittingly engages in the glenoid which the scapula head includes are set on a specified reference horizontal plane, and at the same time, the bases of wings which are made of the humeruses are controlled in position, forward or backward, so that the right facing position is correctly adjusted, and furthermore, the controlled and adjusted conditions are in a secured manner fixed by a mounting member; therefore not only is the right facing position which the work assumes held correctly in a secured manner, but a processing reference in the subsequent steps can also be set using the horizontal reference plane and the right facing position as reference, whereby the subsequent processing steps can correctly be executed with certainty.

In the last stage of the preliminary process, a measuring/storage step for measuring internal sizes of the work associated with the scapula heads thereof, left and right, in which individuality of the work is conspicuously revealed is provided. In the step, the measurement is performed in conditions where the work is set on specified reference horizontal plane and correctly assumes the right facing position and widths are separately measured as distances up to the inner sides of scapula heads, left and right from the work center in the right facing position. Hence, control in movements of members performed symmetrically with respect to the work center can be done on the respective left and right sides separately with simplicity and correctness.

The measured values are stored, which enables the values to be used in processing for various kinds of control in the following steps. An insert position of an oblique run cutter for performing shoulder joint line-cutting in the shoulder joint severing and expanded positions of both end tips of scapula press plates are set based on the stored, measured values, and, based on the settings, tendon cutting is divided into two stages: one for cutting of outward positioned tendons and the other for inward positioned tendons, and the sets of tendons are respectively cut in ways most suitable therefor. Hence, a damage to a meat portion around a cutter in the cutting is confined to the minimum.

On the other hand, wings attached to the breast meat stripped in the breast meat stripping step can automatically be severed from the breast meat by the breast meat severing step, since the breast meat severing step which is branched in the breast meat stripping step is provided.

Since a circulation system, in which process flow is automatically returned back to the work feeding/mounting step after the skelton discharging step is completed, is constituted of the whole steps, unmanned operations can be realized except for the work feeding/mounting step.

An aspect of the present invention which is recited in claim 2 is characterized by that the work mounting in the aspect recited in claim 1 is performed in a manner such that the lower surfaces of scapulas heads of both shoulders are set on a reference horizontal plane, the right facing direction is set by adjusting positions of the bases of the wings and then the set conditions are fixedly maintained from the mounting through completion of the whole deboning process.

As described above, in the work mounting, since a mounting member in the shape of a cone (hereinafter simply referred to cone as well) which is used for fit insertion into an upper half, which is provided with: a horizontal member at the top; wing supports on both sides; and a claw for establishing a right facing position at the front, is used, the lower surfaces of scapula heads of both shoulders are put in contact on the horizontal member so as to be placed on the reference horizontal plane and the right facing position of the work can correctly be set and fixed with the help of the both side wing supports and the claw for establishing a right facing position which presses ribs from the inside when the cone is fit inserted.

The setting conditions of the work is maintained in a fixed manner from the work mounting till completion of the whole deboning process.

An aspect of the present invention recited in claim 3 is characterized by that the measurement on specific portions recited in claim 1 is to measure distances between the inner sides of the scapula heads of both shoulders and the work center in a right facing position in which individuality of each work is conspicuously revealed and the measurement is carried out under conditions that the lower surfaces of the scapula heads are set on a reference horizontal plane and at the same time the work is set in the right facing direction, which are not disturbed unstable.

As described above, since distances, left and right, between the inner sides of scapula heads and the work center in a right facing position, which show not only a conspicuous difference in measurement in correspondence to individualities of works but gives conspicuous influence on an insert position of a cutter in cutting around a shoulder joint later described, are separately measured, and besides since measurement is performed while the lower surfaces of scapula heads are set on the reference horizontal plane and the work body is fixedly set in the right facing position, such separate measurement greatly contributes to automation at stations in the following stages of the feeding/mounting and improvement on a recovery rate in the deboning process.

Measurement in a height direction is not necessary because the lower surfaces of scapulas are set on a reference horizontal plane determined by the horizontal member provided on the mounting member.

An aspect of the present invention recited in claim 4 is characterized by: that the insert position of an oblique run cutter in the cutting outward positioned tendons which is recited in claim 1 is set when the lower surfaces of scapula heads are set on the reference horizontal plane and the work is fixed in the right facing direction;

that the insert position is set on an intersection line between a vertical plane and a horizontal plane in contact with the tops of the scapula heads, the vertical plane including the outer side of a left or right scapula head which is determined through computation of a sum of a lateral distance between an inner side of the left scapula head and the center of the work in the right facing position and a lateral width of the left scapula head or the outer side of a right scapula head which is determined through computation of a sum of a lateral distance between an inner side of the right scapula head and the center of the work in the right facing position and a lateral width of the right scapula head and intersecting the right facing plane at a right angle thereto; and that an insert angle of the oblique run cutter is set in such a manner that the cutter can contact with an engaging face of the glenoid of the scapula, in which the caput humeri is engaged, and which is open upward and forward off to the left side or right side, so that cutting of the outward positioned tendons can be realized.

The severance of a shoulder joint is divided into two stages, one for the cutting of tendons disposed on the outward side of the joint and the other for the cutting of tendons inward positioned, and at first the outward positioned tendons are cut by the oblique run cutter and thereafter, the work is raised while the caput humeri is pressed downwardly and then the tendons inward positioned are cut by the horizontal cutter.

When the insert position of an oblique run cutter, as described above, is set on an intersection line between a vertical plane and the horizontal plane at a distance of a thickness on average of the scapula heads from the horizontal reference plane, wherein the vertical plane includes the outer side of a left scapula head which is determined through computation of a sum of a lateral distance between an inner side of the left scapula head and the center of the work in the right facing position and a lateral width of the left scapula head or the outer side of a right scapula head which is determined through computation of a sum of a lateral distance between an inner side of the right scapula head and the center of the work in the right facing position and a lateral width of the right scapula head and intersects the right facing plane at a right angle thereto, since the insert direction of the oblique run cutter is beforehand set so as to be open upward and forward off to the outside, so that the cutter can contact with the engaging face, a blade edge of the cutter can be put in contact with the outward positioned tendons almost perpendicularly and thereby the cutting can be performed without any damages on meat portion near the cutting position with good efficiency.

An aspect of the present invention recited in claim 5 is characterized by that the leftward/rightward movement positions of both end tips of caput humeri press plates in cutting of inward positioned tendons which is recited in claim 1 are set on the vertical plane, which has been computed in claim 4, including the outer side of a scapula head and intersecting the right facing plane at a right angle thereto; and that the caput humeris are pressed down by rise of the work and gaps into which the horizontal cutter can be inserted are formed between the lower surfaces of the scapula heads in which the glenoids are included and the tops of the caput humeris, so that the cutting of the inward positioned tendons is enabled.

With the above described constitution, since meat portions on the wing sides are pressed down by the press plate, the meat portions are prevented from not only being put in contact with the horizontal cutter but being cut and the tendons inward positioned are cut in a secured manner. An aspect of the present invention recited in claim 6 is characterized by that in the preliminary process step recited in claim 1, a shoulder skin stripping section, a shoulder portion cutting section, a furcula portion cutting section and a back muscle cutting section are provided, whereby a cut opening in meat around the tops of both shoulders, a cut opening in meat around the furcula and a cut opening in the back muscle can be formed.

With the above described constitution, in the preliminary process, measurement of width sizes such as the scapulas and the like is enabled by the shoulder skin stripping section and the shoulder cutting section; meat cut openings in the neighborhood of the tops of both shoulders, cut openings around bone and meat portions of the furcula and cut openings around the back muscle are in advance formed by the shoulder portion cutting section, the furcula portion cutting station and the back muscle cutting section; and then breast meat stripping can be performed at a high recovery rate, so that in cooperation with a cut opening formed in a white meat thin membrane in a later step, white meat removal can also be conducted with a high recovery rate.

An aspect of the present invention recited in claim 7 is characterized by that the white meat removing step recited in claim 1 includes a white meat line cutting step of forming a cut opening by conducting line cutting in a membrane covering the white meat in the preceding stage.

Since the white meat line-cutting step is provided as a preceding step of the white meat removing step, in cooperation with cut opening processing in the top of shoulder meat in the shoulder meat portion cutting step and cut opening processing in a bone portion around the furcula in the furcula portion cutting step in the preliminary process, meat is prevented from tearing off and the like, so that a good recovery rate can be achieved.

An aspect of the present invention recited in claim 8 is characterized by that the breast meat severing step recited in claim 1 comprises: a transfer section on which breast meat is held while being hanged by hooking end tips of humeruses of wings stripped in the breast meat stripping step at outsides of respective two conveyors running in parallel; a horizontal support section for horizontally supporting the humeruses, left and right, by a robot hand; a one-side cutting section for horizontally cutting, from one side, a juncture between a humerus horizontally held and the breast meat; a rotary section for rotating the humeruses by the robot hand through 180 degrees; and an other side cutting section for horizontally cutting the other side of the juncture which has been turned.

Then, an aspect of the present invention which is recited in claim 9 is directed to an automatic deboning apparatus for an upper half of a poultry carcass, including a plurality of stations respectively provided with a work feeding/mounting section, a preliminary process section, a shoulder joint severing section, a breast meat stripping section, a white meat removing section, and a skelton discharging section, wherein a work is subjected to a tact transport through the stations so as to move from one station to the next after desired processing in the one station is completed while being fixedly supported, so that deboning is completed, the apparatus comprising: a group of stations, which are arranged as in a wheel, and in which the processing sections are respectively equipped in the written order; a main tact transport of a circulation type in which desired deboning processing is performed while the work is supported and moved station by station; an auxiliary tact transport for breast meat severance which connects with a station equipped with the breast meat stripping section; and a group of stations accompanying the auxiliary tact transport;

wherein a station equipped with the work feeding/mounting section has a setting function for a reference plane and a right facing plane necessary for a deboning process;

a group of stations equipped with the preliminary process section comprises a station equipped with an automatic work measuring/storage section;

a group of stations equipped with the shoulder joint severing section compute and use data formed by the measuring/storage section; and the group of stations accompanying the auxiliary tact transport comprises a wing transfer section, a humerus horizontal support section, a one side cutting section, and an other side cutting section.

With the above described construction, an automatic deboning apparatus for an upper half of a poultry carcass of the present invention comprises: a plurality of stations which respectively have desired functions for deboning arranged as in a wheel at equal angular intervals on and along an outer periphery of a mounting table; a main tact transport which repeats movement of stoppage and stepwise advance while placing a work mounted to the station at a right facing position in each advance; and an auxiliary tact transport for separation breast meat by severing branching from a station provided with the breast meat stripping section in the stations.

While the above described stations include a station provided with a work feeding/mounting section; a group of stations provided with a preliminary process section, a group of stations provided with a shoulder joint severing section, a station provided with a breast meat stripping section; a group of stations provided with a white meat removing section; and a station provided with a skelton discharging section, the groups of stations are arranged in the written order as in a wheel and a station provided with the first work feeding/mounting section is located after a station provided with the skelton discharging section.

Since in one of the latter stages of the group of stations provided with the above described preliminary process section, a station provided with a measuring section is located, individuality of a work can automatically be absorbed by using a measured value attained in the station and especially in a station provided with a shoulder joint severing section, since an insert position of an oblique run cutter in the cutting operation is set absorbing a difference in individuality of works, reduction in a recovery rate which has been experienced can be prevented from occurring.

Since the stations are arranged as in a wheel and the main tact transport is of a circulation type in which stepwise advances are conducted through stations, the main tact transport receives a work at a station provided with the work feeding/mounting section and sequentially the main tactic transport advances stepwise to stations in the following stages and is again returned back to the work feeding/mounting section by way of a station provided with the skelton discharging section.

Therefore, when feeding a work is conducted at a station provided with the work feeding/mounting section after each stepwise advance, an unmanned deboning process can automatically be carried out.

Besides, a wing which has been transferred can receive a continuous severing process in an auxiliary tact transport for breast meat severance as well.

An aspect of the present invention recited in claim 10 is characterized by that the main tact transport recited in claim 9 comprises: a mounting table on which the work advances station by station in a stepwise manner with specified angular intervals to travel from one station to the next after stoppage at the one station and completion of specified processing on the work within a specified time, a cyclic movement of a stepwise advance, stoppage, deboning related processing, and the next stepwise advance is repeated so that the work as a result of the cyclic movement is returned back to a station provided with the work feeding/mounting section at its starting position; a plurality of cones provided on the table, each of which makes the work face outwardly in a radial direction so as to assume a right facing position; and a drive mechanism which enables stoppage at specified positions and tact transport.

As describe above, since the main tact transport has a table structure which is a disk-like rotary body equipped with a drive mechanism whereby positional control which enables stoppage at specified positions, and stepwise angular advances, not only can the main tact transport stop at a specified position correctly of the respective stations but positional relations among the stations are correctly secured when the main tact transport stops. Besides, since cones for work mounting loaded on the mounting table are fixed at specified respective positions on the table, the cones are held at the specified positions together with the table, specified processing is completed on the stoppage of the table, a cyclic movement of a stepwise advance, stoppage, deboning related processing, the next stepwise advance and the like is repeated so as to complete a series of deboning related steps, so that cyclic movement is returned back to the work feeding/mounting section which is the first starting point, accordingly a continuous automatic deboning process can be realized.

An aspect of the present invention recited in claim 11 is characterized by that the cycle movement recited in claim 10 is a cyclic movement constituted of a stepwise advance, stoppage, table rise, deboning related processing, table lowering, the next stepwise advance, and that the main tact transport further comprises a vertical shift mechanism whereby position control and speed control are enabled.

The cyclic movement of a tact transport includes a cyclic movement of a stepwise advance, stoppage, table rise, deboning related processing, table lowering, the next stepwise advance, wherein a vertical shift mechanism whereby positional control and speed control are enabled is further provided to the tact transport, and therefore various changes can be allowed in deboning related processing, which enables high level processing to be realized.

An aspect of the present invention recited in claim 12 is characterized by that the cones recited in claim 10 assume respective right facing positions to face outward in radial directions at respective angular positions along the circumference divided at angular intervals each corresponding to a stepwise advance; that shoulder stoppers for setting the work on a specified reference horizontal plane is provided at the top of each of the cones; that wing supports for setting the work in a right facing direction are provided on both sides thereof; and that a claw which is used for fixing the work in the right facing position by pressing the inserted work from the inside thereof, wherein the claw, which is used for fixing the work in the right facing position, enables a skelton to be discharged and a work to be fed and mounted being released from a fixing state by engagement with a fixed cam plate when the mounting table is raised in stations respectively provided with the work feeding/mounting section and the skelton discharging section, whereas the fixing state is maintained in the other following stations.

With the above described construction, since cones, which are used for mounting and fixing a work are provided in such a manner that the cones are made to assume respective right facing positions facing outwardly in radial directions at respective angular positions along the circumference divided at angular intervals each corresponding to a stepwise advance; that a shoulder fixing part, which is put in contact with the lower surfaces of scapula heads of the work, for setting a specified reference horizontal plane of a work is provided at the top of each of the cones; that wing supports for setting the work in a right face direction is provided on both sides thereof; and that a claw which is used for fixing the work in a right facing position by pressing a rib part of the inserted work from the inside with a spring action, the work which is fixedly set in a fitting inserted manner by a cone which has the above described structure can accurately receive desired processing in each station in a secured manner while the work is fixedly set and maintained in a right facing position facing toward a radial direction on a specified reference horizontal plane in a station other than stations respectively including the work feeding/mounting section and the skelton discharging section.

The claw which is used for fixing the work in its right facing position is released from its fixing state by engagement with a fixed cam plate when the mounting table is raised in stations respectively including a work feeding/ mounting section and a skelton discharging section, which enables a skelton to be discharged and a work to be fed and mounted, whereas in other stations, which follow both stations, the fixing state is maintained.

The center position of a work in its right facing position recited in each of claims 3, 4 and 14 is the center position of a cone inserted in the work.

An aspect of the present invention recited in claim 13 is characterized by that the group of stations provided with the preliminary process section recited in claim 9 comprises: a station provided with a shoulder skin stripping section; a station provided with a shoulder portion cutting section; and a station provided with a furcula portion cutting section and a back muscle cutting section.

With the above described construction, a skin of a work is scraped in a station provided with the shoulder skin stripping section to expose the inside and meat portions at the tops of both shoulders are cut to form cut openings in stations provided with the shoulder portion cutting section and the furcula portion cutting section, so that distances between the center of the work in its right facing position and inner sides of both scapula heads, left and right, can accurately be measured.

With a cut opening formed by cutting in meat portions at the tops of both shoulders, a cut opening between bone and meat portions around the furcula formed by the furcula portion cutting section and a cut opening by line-cutting in a thin membrane of white meat performed in the preceding stage of the white meat removal, tearing-off of white meat which has been observed in a conventional white meat removal is perfectly eliminated and accordingly, processing with a high recovery rate can be secured without any reduction in quality.

An aspect of the present invention recited in claim 14 is characterized by that a station provided with the measuring/ storage section recited in claim 9 is disposed after a station provided with the furcula portion cutting section and the back muscle cutting section, and the measuring section comprises: leftward/rightward inclination detecting bars, which are inserted inside the scapula heads which are set on the reference horizontal plane, and each of which is inclinable separately leftward or rightward with respect to the center of the work in its right facing position; a sensor for sensing an inclination of each detecting bar; and two control motors each with a memory for outward movement, separately leftward or rightward, of the bar.

With the above described construction, since internal widths between the center of the work in its right facing position and the insides of the scapula heads are separately measured on the left side or right side and amounts of outward movements in the measurement are stored, the measured values can be utilized in the most suitable manner in control of a movement mechanism which acts separately at the symmetrical positions on the left side or right side of the processing section which comes later.

An aspect of the present invention recited in claim 15 is characterized by that the group of stations equipped with the shoulder joint severing section recited in claim 9 is a group of stations equipped with a shoulder line-cutting section and a side portion cutting section.

An aspect of the present invention recited in claim 16 is characterized by that a station equipped with a shoulder line-cutting section recited in claim 15 comprises: a cutter insert position computing section; and an oblique run cutter, with a control mechanism, which is positioned based on a pair of separately measured values on the left and right sides, and which moves symmetrically to the left and right sides.

With the above described construction, an insert position of an oblique run cutter can be set in a station including the measuring section in the following steps of: computing a value obtained as a sum of a lateral distance between an inner side of a left scapula head and the center of the work in the right facing position and a lateral width of a left scapula head, or a sum of a lateral distance between an inner side of a right scapula head and the center of the work in the right facing position and a lateral width of a right scapula head in the computing section; determining a position of the outer side of the left scapula head from the center of the work in its right facing position or a position of the outer side of the right scapula head from the center of the work in its right facing position; and setting a vertical plane including the outer side of a scapula head, left or right, perpendicular to the right facing plane of the work;

setting a horizontal plane put in contact on the upper surfaces of the scapula heads whose lower surfaces are put in contact on the horizontal reference plane;

attaining intersection lines between the horizontal plane and the vertical planes; and setting the insert positions of the oblique run cutters on the respective intersection lines.

Since the measured values are obtained from the center of a work in an right facing position separately on the left and right sides, the movement mechanism can correctly be controlled in a simple manner in adaptation to sizes of work and a difference between distances to both inner sides of the scapula heads.

An aspect of the present invention recited in claim 17 is characterized by that a station including the side portion cutting section recited in claim 15 comprises: a computing section for computing movement positions, leftward and rightward, of end tips of a horizontal press plates which press down the caput humeris as the cone is raised; a pair of horizontally oscillating rotary cutters, left and right, moving inward separately on the left and right sides; and press plates respectively with downward pointed protrusions at end tips, disposed in a spaced manner under the cutters.

The computation is only required to compute distances to end tips of the press plates from the center of a work in a right facing position as in the case of a station including the shoulder line-cutting section.

An aspect of the present invention recited in claim 18 is characterized by that a station equipped with the breast meat stripping section recited in claim 9 comprises: a chuck for holding humeruses of wings, left and right, pressing from both sides; a guide mechanism for guiding the chuck, which holds the wings, linearly in a direction downward at a specified angle; and an actuator for movement.

With the above described construction, open/close guide pins and a chuck open/close guide, both of which enable the chuck to hold a work using a fixed claw forked in two ways and a movable claw both of which constitute the chuck, hold the humeruses of the wings, left and right, with a curved portion of the guide at the same time as the first stage in inclining motion of an operating handle; the wings which have been held are released from the curved portion at the end of the guide in the final stage of the inclining motion; and an inclination sliding mechanism whereby the fixed claw is contracted or extended in an axial direction with increase in inclination of the operating handle and a main guide pin and a main guide which control a degree of sliding enable the wings together with a breast portion to be stripped from the work as the operating handle gets inclined, wherein when a inclining direction of the guide in the guide mechanism which is constructed of the main guide and a chuck open/close guide for guiding the stripped breast meat in a linear manner is properly set, the breast meat accompanying the wings can be prevented from small pieces of cartilage stuck in breast meat due to contact of the breast meat with ribs and contamination such as mixing.

An aspect of the present invention recited in claim 19 is characterized by that a station provided with a white meat removing section recited in claim 9 comprises a station which is provided with a white meat line-cutting section in the preceding stage, wherein the station which is provided with the white meat line-cutting section includes a unit which enable two line-cuttings, and the unit comprises: a cutter mechanism which enables a cut opening in membrane tissue to be formed, performing cutting of the membrane tissue only; a press mechanism of the cutter; and a cutter run mechanism in a direction, downward off to a side.

With the above described construction, since there is provided a line-cutting section whereby a cut opening is formed only on the membrane tissue surface by cutting a thin membrane covering white meat in advance, the interior of the white meat which is covered by the thin membrane is prevented from damages, the cut opening is formed in the membrane, the white meat can be separated from a bone portion through the cut opening, and as a result, there is no need for forcibly tearing off part of the membrane and then taking out white meat in a later stage of white meat removal, which has heretofore been conducted, and which entails a high recovery rate of meat to be secured.

An aspect of the present invention recited in claim 20 is characterized by that a station provided with the white meat removing section recited in claim 9 comprises: a pair of chucks which secure strong grasping; a grasping mechanism for grasping an end of white meat by end tips of a chuck while pushing away a furcula; a stripping mechanism for stripping grasped white meat in a direction, downward off to the front side; and a movement preventing member for a skelton end portion which is provided above the top of the skelton so as to be able to be put in contact with the skelton, wherein the grasping mechanism is provided with recesses and protrusions or a long hole opening on grasping surfaces.

With the above described construction, since white meat stays perfectly separated from peripheral portions with almost freedom by: a cut opening formed in a white meat thin membrane tissue; and a cut opening in meat at the top portions of both shoulders formed by the shoulder portion cutting section in the preliminary process and a cut opening at a bone portion around the furcula formed by the furcula portion cutting section, which cut openings are effective for white meat portions on both sides of the furcula, then the white meat can be stripped with ease downward at an angle starting at the top of the skelton system, which is restricted from forward inclining by the movement preventing member which is put in contact on the top of the skelton, wherein the fore-ends of the two chucks, left and right, are moved closely to the furcula from both sides thereof so as to push the furcula and ends of the white meat are strongly grasped by the respective sets of fore-ends of the chucks.

A chuck is constructed of grasping pieces having scissors-like shape so as to enable pressing an object from both sides and press surfaces are provided with recesses and protrusions or long hole openings thereon, whereby the end of white meat can be grasped in a secured manner while a meat portion held is pressed into the recesses.

An aspect of the present invention recited in claim 21 is characterized by that a station provided with the skelton discharging section recited in claim 9 comprises: a fixed cam plate which releases a work from a fixing state by retreating a claw which is used for fixing the work in an right facing position; a grasp handle which freely opens and closes for discharging a skelton; and an oscillate discharging mechanism for discharging a grasped skelton to a chute.

With the above described construction, in a station including a skelton discharging section, when the mounting table is raised, a fixing claw for the work in its right facing position inside the cone is retreated from a rib part of the work while the fixing claw is engaged with a fixed can plate disposed at the periphery of the mounting table. Therefore, the work is left in a condition where the work can freely be released from the cone, and the skelton is grasped and taken out by a grasp handle for discharging a skelton and discharged to a chute with the help of the oscillate discharging mechanism.

An aspect of the present invention recited in claim 22 is characterized by that the auxiliary tact transport recited in claim 9 comprises: parallel run conveyors; a grasp rotary mechanism; and a horizontal cutter which can oscillate leftward and rightward, and further comprises: a transfer section for receiving wings together with breast meat from the main tact transport and transferring them to the parallel run conveyors in a hanging condition; a horizontal support section for humeruses; a one side cutting section for forming a cut opening between a humerus supported and breast meat; and an other side cutting section for forming a cut opening on the other side of the work, which has been reversed by rotation, whereby the breast meat can be severed.

With the above described construction, wings together with breast meat in a hanging condition to be supported by the wings on the parallel run conveyors, which have been transferred from the main tact transport, are held in such a manner that the humeruses are horizontally maintained on bars, and horizontally held portions of the humeruses are cut by the one side cutting section and the other side cutting section, one side at one time, whereby the breast meat is separated.

In the above described way, since the breast meat can be severed with no contact the members of the apparatus and junctures with the humeruses are cut off from both sides, severance of the breast meat at a high recovery rate can be realized.

BRIEF DESCRIPTION OF THE DRAWINGS

FIGS. 5(A), 5(B) are views of a skelton system showing a work mounting condition in a work feeding/mounting section of FIG. 1, wherein FIG. 5(A) is a side elevational view and FIG. 5(B) is a front elevational view.

FIG. 6 is a schematic view showing shoulder a skin stripping condition by a shoulder skin stripping section of FIG. 1.

FIG. 7(B) is a view showing movement of a cutter as seen from above.

FIGS. 8(A), 8(B) are schematic views of a skelton system showing a stripping condition for meat and an envelop around a furcula by the furcula portion cutting section of FIG. 1, wherein FIG. 8(A) is a side elevational view and FIG. 8(B) is a front elevational view.

FIGS. 10(A), 10(B) are schematic views showing a measuring condition by a measuring section of FIG. 1, wherein FIG. 10(A) is a view showing a condition before insertion of measuring bars and FIG. 10(B) is a view showing a condition of measurement.

FIGS. 11(A), 11(B) are schematic views showing severing conditions of shoulder joints by a shoulder joint severing section of FIG. 1, wherein FIG. 11(A) is a view showing a condition of shoulder line-cutting and FIG. 1(B) is a view showing a condition of side portion cutting.

FIG. 12(B) is a schematic view showing breast stripping operation.

FIGS. 13(A), 13(B), 13(C) are schematic views showing conditions of white meat line cutting by a white meat line cutting section of FIG. 1 and a view of a member of the section, wherein FIG. 13(A) is a front elevational view, FIG. 13(B) is a side elevational view and FIG. 13(C) is a view showing a structure of a cutter.

FIGS. 18(A), 18(B), 18(C) are views showing a skelton system configuration of the upper half of a poultry carcass of FIG. 16, wherein FIG. 18(A) is a front elevational view as viewed from the breast side, FIG. 18(B) is a side elevational view and FIG. 18(C) is a rear elevational view.

Alphanumeric marks used in the figures will be explained: 20 indicates a main tact transport, 21 a mounting table, 22 a cone, 23 wing supports, 24 a claw, 25 a stepwise drive section, 26 a vertical shift mechanism, 29 a main tact transport section, 30 an auxiliary tact transport section, 31 a work feeding/mounting section, 32 a preliminary process section, 33 a shoulder joint severing section, 34 a breast meat stripping section, 35*a* a white meat line-cutting section, 35*b* a white meat removing section, 36 a skelton discharging section, 37 a wing transfer section, 38 a humerus horizontal support section, 39*a* a one side cutting section, 39*b* a rotary reversing section. 39*c* an other side cutting section, 40*a* a breast meat discharging section, 40*b* a wing discharging section, 41 an auxiliary transport, 41 parallel run conveyors and 41*b* a wedge like insert plate.

DETAILED DESCRIPTION OF THE PREFERRED EMBODIMENT

Below, embodiments of the present invention will be described in reference to the accompanying drawings. It is to be noted that description of a size and shape of a constituent part, relative positions of parts and the like in the embodiments are not intended to restrict the scope of the present invention to those unless otherwise specified but rather are indicated for illustrative purposes only.

Figure 1:
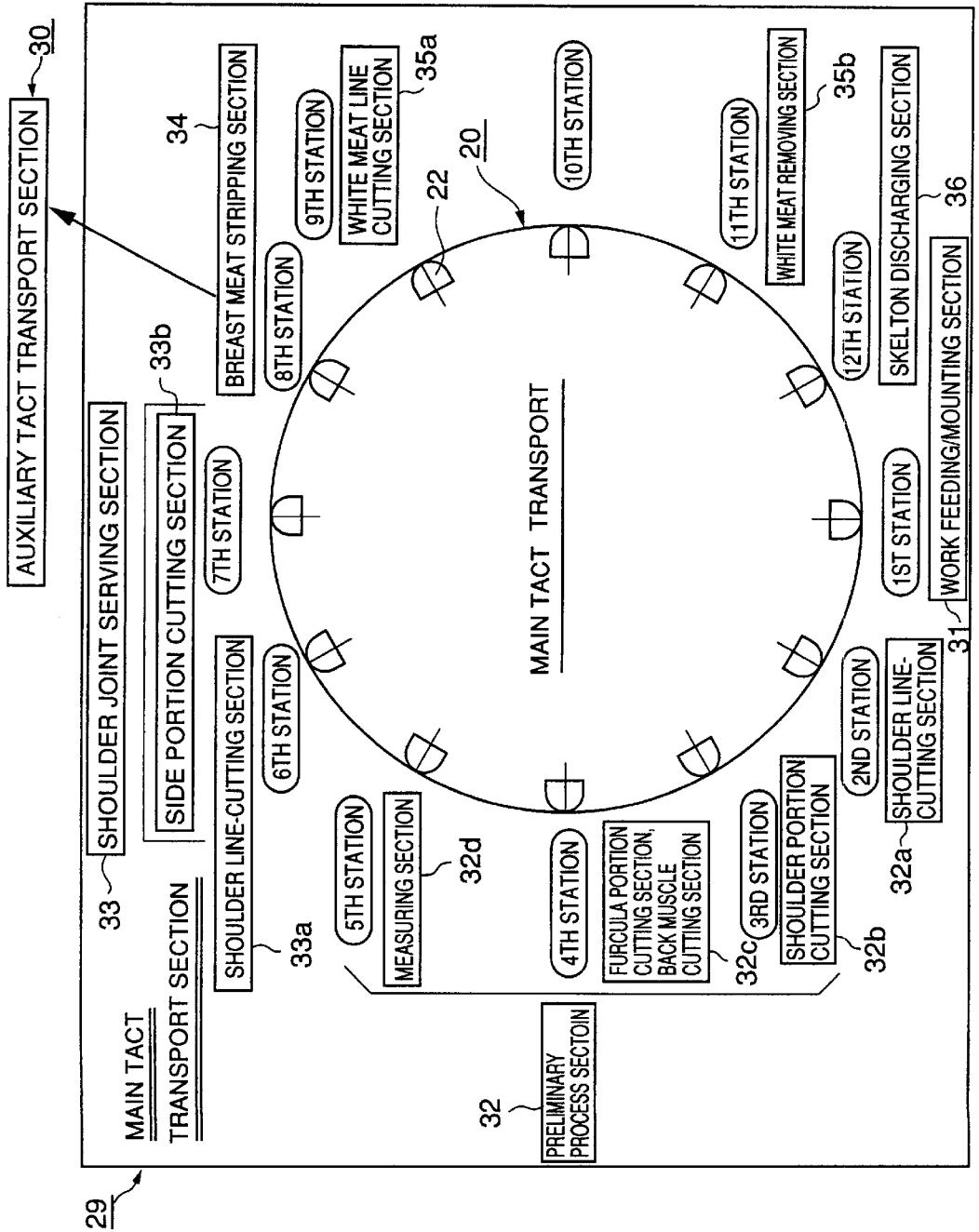
FIG. 1 is a schematic view showing construction of an automatic deboning apparatus for an upper half of a poultry carcass of the present invention.
Figure 2:
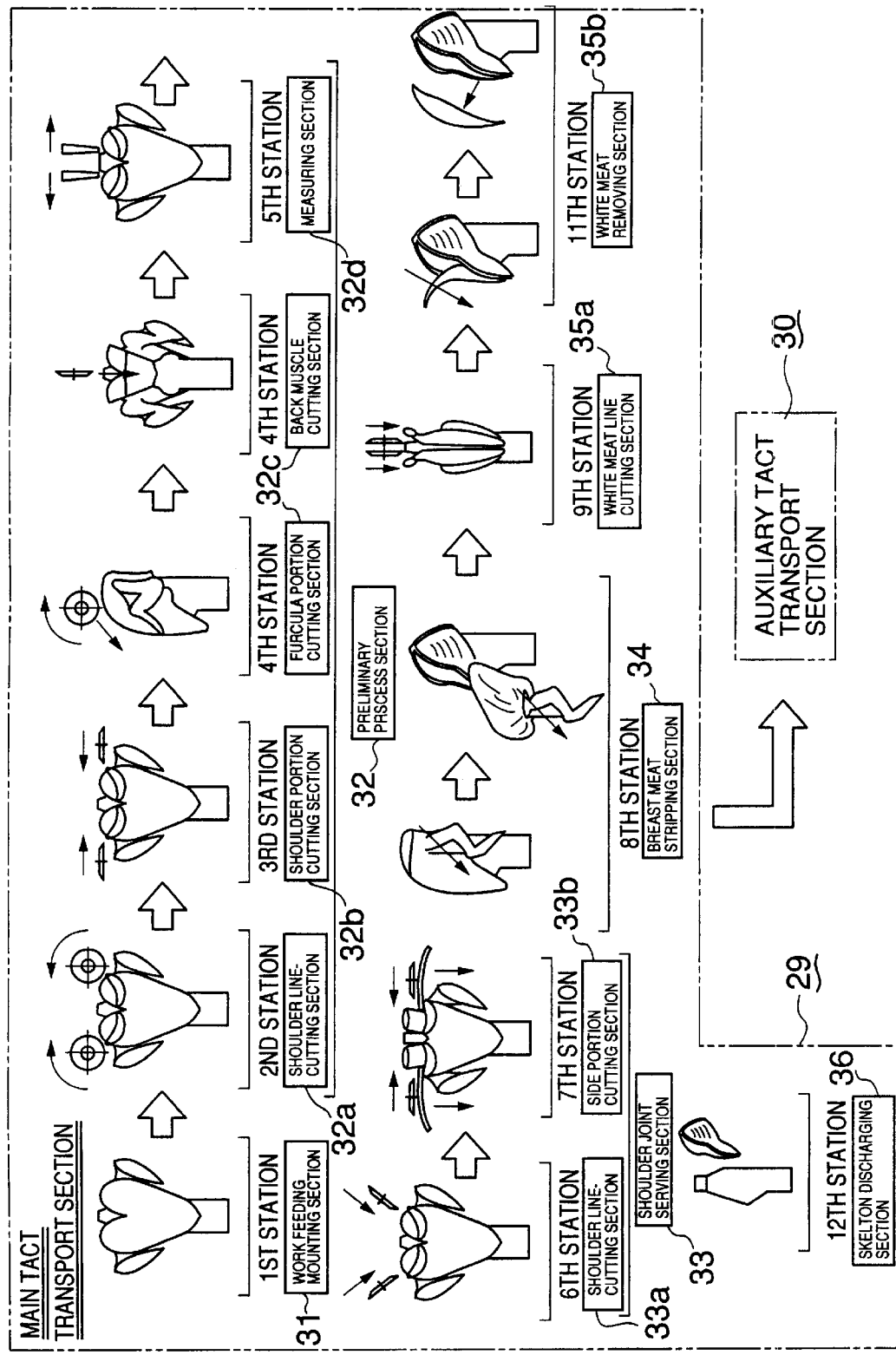
FIG. 2 is a representation of successive process steps illustrating a function of a main tact transport section of the FIG. 1.
Figure 3:
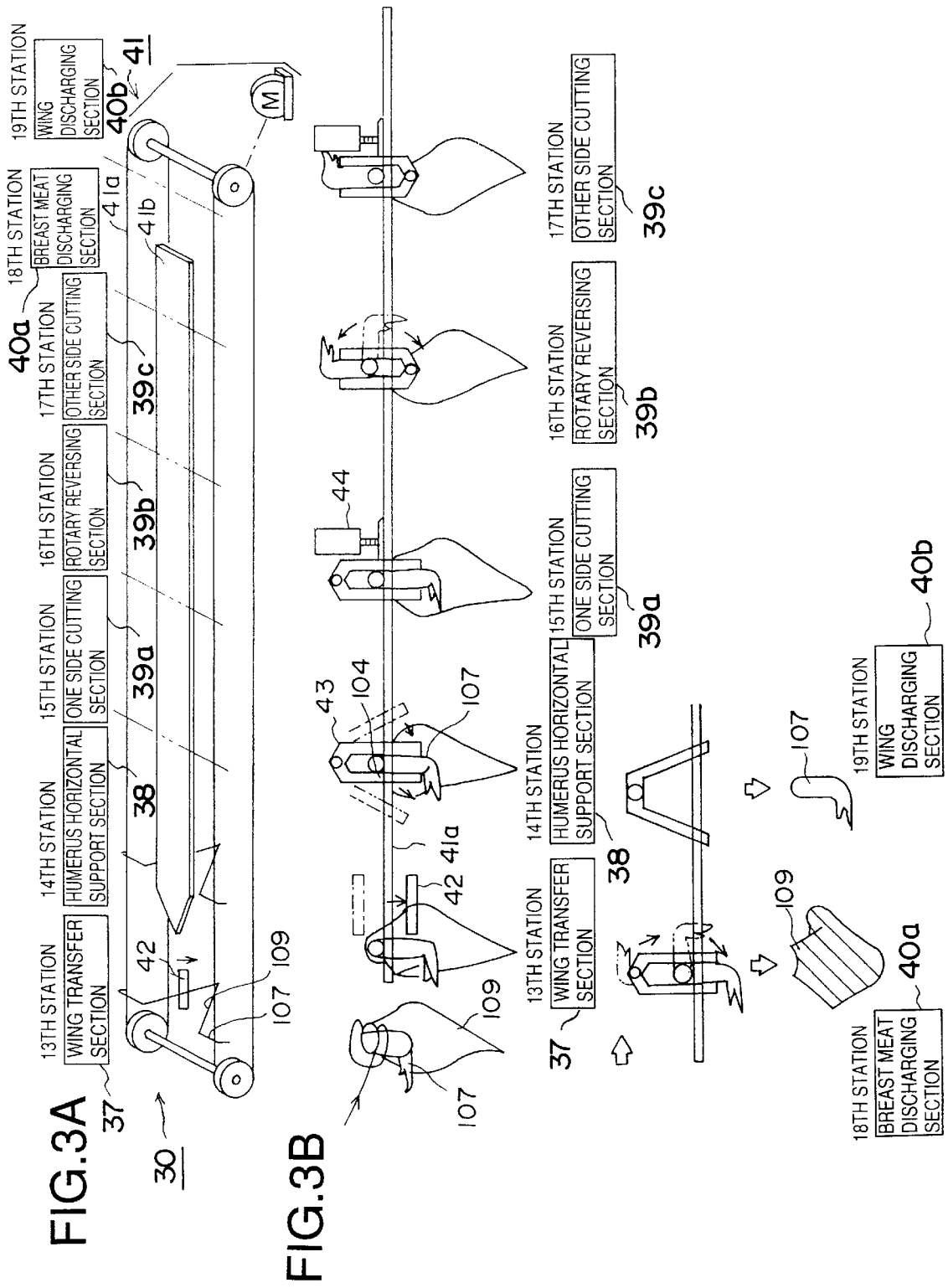
FIG. 3(A) is a schematic view showing construction of an auxiliary tact transport section of FIG. 1.
FIG. 3(B) is a representation of successive process steps illustrating a function of the auxiliary tact transport section of FIG. 1.
Figure 4:
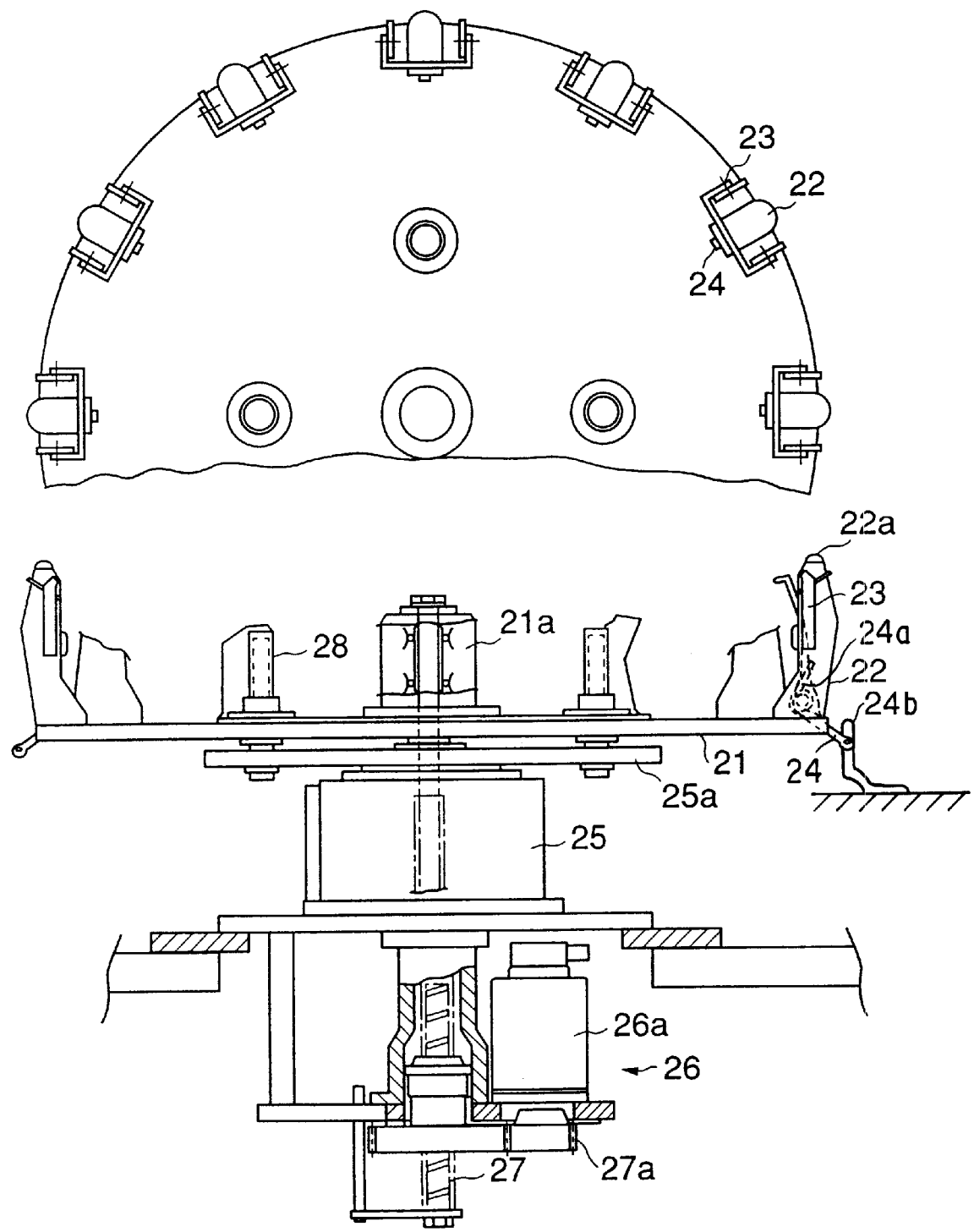
FIG. 4 is a schematic view showing construction of the main tact transport of FIG. 1.

FIG. 1 is a schematic view showing a schematic construction of an automatic deboning apparatus for an upper half of a poultry carcass of the present invention, FIG. 2 is a representation of successive process steps illustrating a function of a main tact transport of the FIG. 1, FIG. 3(A) is a schematic view showing construction of an auxiliary tact transport of FIG. 1, FIG. 3(B) is a representation of successive process steps illustrating a function thereof and FIG. 4 is a schematic view showing construction of the main tact transport of FIG. 1.

As shown in FIG. 1, the automatic deboning apparatus for an upper half of a poultry carcass of the present invention comprises: a main tact transport section 29 and an auxiliary tact transport section 30.

The main tactic transport section 29 comprises: a main tact transport 20 and a group of $1^{st}$ to $12^{th}$ stations.

The group of stations are located so that the stations accurately assume dividing positions with angular intervals of 30 degrees on the circumference of the main tact transport 20 along it as in a wheel and in the respective stations, the following processing sections are disposed in such a manner that the sections correctly face in radial directions about a rotary center of the tact transport to assume a right facing position:

- a work feeding/mounting section 31 is disposed in a $1^{st}$ station;
- a preliminary process section 32 is disposed in $2^{nd}$ to $5^{th}$ stations, wherein
- a shoulder skin stripping section 32a is disposed in the $2^{nd}$ station,
- a shoulder portion cutting section 32b is disposed in the $3^{rd}$ station,
- a furcula portion cutting section 32c is disposed in the $4^{th}$ station,
- a measuring section 32d is disposed in the $5^{th}$ station; a shoulder joint severing section 33 is disposed in $6^{th}$ to $7^{th}$ stations, wherein
- a shoulder portion cutting section 33a disposed in the $6^{th}$ station,
- a side portion cutting section 33b disposed in the $7^{th}$ station;
- a breast meat stripping section 34 is disposed in an $8^{th}$ station;
- a white meat line-cutting section 35a is disposed in a $9^{th}$ station;
- a white meat removing section 35b is disposed in an $11^{th}$ station; and
- a skelton discharging section 36 is disposed in an $12^{th}$ station.

The main tact transport 20 comprises: a mounting table 21 which is rotated while keeping in contact with inner sides of the group of 12 stations which are disposed along the circumference; a stepwise drive section 25 which rotates the table 21 at an angular dividing interval of 30 degrees in one stepwise advance about the center thereof according to an input signal; and a vertical shift mechanism 26 which shifts the table 21 upward to and downward from a specified height when the stepwise angular movement is ceased. In the figure, a condition when the mounting table 21 is raised to the specified position are shown.

The vertical shift mechanism 26 comprises: a servo motor 26a; a gear train 27a; and a fixed upright ball screw 27 which can be raised or lowered by rotation of the gear train 27a, wherein vertical shift of the upright ball screw 27 is accurately controlled in position and speed through rotation of the servo motor 26a. On the other hand, the mounting table 21 is not only freely rotatably fixed on the top end of the ball screw 27 with a bearing portion 21a interposed therebetween but vertically shiftable as the ball screw 27 shifts vertically while rotating together with a stepwise drive plate 25a, later described, with the help of linear guides 28.

The stepwise drive plate 25a is coupled directly with a stepwise drive section 25 including a motor which is used for precise control of a rotation angle of the drive plate 25a and the stepwise drive section 25 enables precise angular dividing of a full 360 degrees of rotation of the drive plate 25a for stepwise movements and controlling retention of a stop position thereof. The mounting table 21 is stepwise rotated at a rate of a specified angle of 25 degrees in one stepwise movement each time an input digital signal is issued from a control section, not shown, and not only stopped but retained at the stations constituting the group while the processing sections assume right facing positions, respectively.

Then, after the vertical shift mechanism 26 is activated by a stop signal for the stepwise drive section 25, the mounting table 21 is raised to a specified position and a specified stoppage time is elapsed at the specified position, the mounting table 21 is lowered back to an original position, whereby vertical movement, upward and downward, of the mounting table 21 is completed.

During the specified stoppage time, manual feeding/mounting of a work is performed in the work feeding/mounting section 31 and specified deboning processing and skelton discharging are automatically conducted in respective other stations.

Since there is a need that various different steps associated with the deboning processing conducted in respective stations are all completed during the stoppage time of the vertical shift mechanism 26 at a raised position with a specified height, lowering of the vertical shift mechanism is activated according to AND processing of specific deboning completion signals from the respective stations so that all the stations can be moved in synchronization.

Cones 22, each of which is a mounting member, described later, whereby a work is fixedly held, are respectively disposed on the mounting table 21 at the right facing positions (which correspond to positions along the circumference divided in specified angular intervals of 30 degrees), while the cones 22 face outwardly in radial directions and correctly toward the respective processing sections disposed at the stations of the group which are arranged as in a wheel.

The cones 22 each are provided with a claw 24, which is included in a cone 22 as described later, for fixing a work in an right facing position and the work, which is fixedly inserted by a cone 22 and set so as to assume a right facing position, is fixedly locked, whereas the claw 24 is released from the locking state in the skelton discharging section 36 and the work feeding/mounting section 31 when the mounting table 21 is raised.

Since time lengths required in stations for deboning processing are different from one another, a downward movement of the vertical shift mechanism 26 and reactivation of the stepwise drive section 25 are recommended to be performed based on AND processing of input stop signals issued prior to the downward movement or the reactivation as described above.

The stepwise drive section 25 is recommended to be of a resolver type or of a stepping motor type which can be locked at a stop position.

Since the main tact transport section 29 has the above described construction, as shown in FIG. 2 feeding/mounting of a work to a cone 22 in the work feeding/mounting section 31 at the 1$^{st}$ station and take-out of a skelton from a cone 22 in the skelton discharging section 36 at the 12$^{th}$ station are performed during a stoppage time when the mounting table 21 is in a raised condition and locking by the claw 24, which is included in the cone 22, is canceled, and after the time period is elapsed, a locking state of the claw 24 is restored in company with lowering of the table 21, whereby feeding/mounting to a cone 22 of a work is completed in a secured manner without receiving any constraint from the claw 24 during the stoppage time while the work is fittingly inserted into the cone and assumes a right facing position. The locking state of the work by the claw 24 is continued till the white meat removing section 35b prior to the skelton discharging section 36 in a later stage.

That is, as shown FIG. 4, since the claw 24 is free from locking by engagement with the cam plate 24b in the work feeding/mounting section 31 when the mounting table 21 is on the rise, insertion into the cone 22 and assuming a right facing position of a work is surely carried out without receiving any restraint and thereafter, the locking state is restored since engagement of the claw 24, used for fixing the work in the right facing position, with the am plate 24b is canceled in company with lowering of the mounting table 31, whereby mounting of a work in a fixed manner can be secured. Thereafter, the claw 24 is kept to fixedly hold the work till rise of the table in the skelton discharging section 36.

Then, the mounting table 21 is stepwise rotated while a work is subjected to processing in the following steps of: feeding the work at the 1$^{st}$ station; shoulder skin stripping from the work at the 2$^{nd}$ section; forming a cut opening by shoulder portion cutting after the stripping of skin at the 3$^{rd}$ station; furcula portion cutting and back muscle cutting at the 4$^{th}$ station; measuring inside half shoulder widths at the 5$^{th}$ station; shoulder line cutting at the 6$^{th}$ station; side portion cutting at the 7$^{th}$ station; stripping breast meat together with wings using them at the 8$^{th}$ station; line-cutting in a white meat membrane at the 9$^{th}$ station; white meat removing at the 11$^{th}$ station; and skelton discharging at the 12$^{th}$ station.

Then, the auxiliary tact transport section 30 will be described. The section 30, as shown in FIG. 3A, comprises: an auxiliary tact transport 41 constructed of parallel run conveyors 41a which forms two parallel run bars and a flat insert plate 41b with a wedge end which is hung in the air between the bars; and a group of 13$^{th}$ to 19$^{th}$ stations disposed in a direction to downstream from the upstream, wherein a wing transfer section 37, a humerus horizontal support section 38, a one side cutting section 39a, a rotary reversing section 39b, an other side cutting section 39c, a breast meat discharging section 40a, and a wing discharging section 40b are respectively disposed in the stations.

In the wing transfer section 37, wings with breast meat 107 which are transported on the parallel run conveyor 41a which forms the two parallel run bars are received by ends of humeruses, the humeruses are horizontally positioned by pressing the middle of the breast meat 109 with a press lever 42, the flat insert plate 41b with a wedge end participates in the transport operation of the work, and the breast meat 109 is held in a hanging condition under the humeruses while the humeruses are placed on the parallel run bars and edges of the flat insert plate 41b.

Then, in the one side cutting section 39a, ulnas 113 of the wings 107 placed horizontally are grasped by the chuck 43 and a cut opening is formed by the horizontal cutter 44 at a boundary with breast meat.

In the rotary reversing section 39c, the chuck 43 is rotated to face in the opposite direction while grasping the ulnas 113, a cut opening is formed in the boundary of the opposite side in the other side cutting section 39c and the severance is thus completed. In the breast meat discharging section 40a, the breast meat 109 is discharged and in the wing discharging section 40b, the wings 107 are discharged.

Below, each constituents of the main tact transport section 29 will be described in reference to related figures.

FIGS. 5(A), 5(B) are views of a skelton system showing a work mounting condition in a work feeding/mounting section of FIG. 1, wherein FIG. 5(A) is a side elevational view and FIG. 5(B) is a front elevational view.

As shown in FIG. 5(B), shoulder stoppers 22a, 22b, which sets a reference horizontal plane for a work 100 on which the lower surfaces of the scapula heads 101, left and right, are put in contact, are provided on the left and right side of the top of the cone 22, and as shown in FIG. 5(B) the claw 24 is provided inside the cone 22, which locks the work in a right face position, and which presses a rib part of the work 100 from inside by a spring 24a. Besides, as shown in FIG. 5(B), there is provided the wing supports 23 which support the wings 107 of the work 100, and which have movable pieces 23a useful for setting the right facing direction in mounting the work, wherein the movable pieces 23a are pivotable about joints in the lower portion of the supports 23.

The claw 24 for fixing the work in a right facing position is forced inside the cone by engagement of the lower end of the claw 24 with the cam plate 24b, not shown, while the claw 24 overcomes a force of the spring 24a shown in a dotted line when the cone 22 is raised together with the mounting table 21.

That is, as shown in FIG. 4, a cone 22 is raised as the mounting table 21 rises in the work feeding/mounting section 31. When a work is fed and fixedly mounted by raising the cone 22, since the claw 24 is released from the locking state by the engagement with the cam plate 24, the work can be fed with certainty without any restraint and made to assume its right facing position being put in contact with the shoulder stoppers 22a by the scapula heads. Thereafter, when the mounting table 21 is lowered, the claw 24 is released from the engagement with the cam plate 24 and the locking state of the claw 24 is restored. That is, the claw 24 is put in contact with the rib part of the work by a force of the spring 24a, so that the work in its right facing position is kept in a right facing direction accurately. This locking state which the work assumes with the help of the claw 24 is continuously kept till the white meat removing section 35b, which enables deboning related processing to be performed with a high recovery rate.

Since the cam plate 24b is not provided between the shoulder skin stripping section 32 and the white meat removing section 35b, the locking state of the claw 24 is kept not to be canceled while the mounting table 21 is repeatedly shifted upward and downward.

When process flow reaches the skelton discharging section 36, the claw 24 is released form the locking state by the engagement with the cam plate 24b as the table 21 is raised and the skelton can freely be taken away from the cone 22.

FIG. 6 is a schematic view showing a shoulder skin stripping condition of a work by a shoulder skin stripping section 32a and the skin stripping is conducted to expose meat 108 of the shoulders by stripping the skin 108a around the shoulder tops so that stabilization of the preliminary process steps in the vicinity of the shoulders such as the furcula portion cutting, measuring and shoulder line cutting which follow the shoulder skin stripping.

In the shoulder skin stripping, there are provided two turbine-runner like rollers, each with a longitudinal section enlarged toward its both edges, attached to lower ends of arms 46b, 46b pivotably connected with a hinge 46d disposed above at the middle of the both shoulders while the arms 46b, 46b are held by springs 46c, 46c in such a manner that the arms 46b, 46b are opened downward, press both shoulders of the work and are swingable leftward and rightward about the hinge 46d, wherein the skin is pushed down, as shown in the figure, while being in contact with the turbine-runner like rollers 46 in rotation as the cone is raised. Hence the skin 108a of the shoulders of the work is rolled away without any damage on meat.

Not only is the damage on the meat prevented from occurring under proper tension imposed on the meat by forces of the spring 46c, 46c but a difference in dimensions between both shoulders of the work can be absorbed, and therefore the skin of both shoulders are stripped in the same way.

Figure 7A:
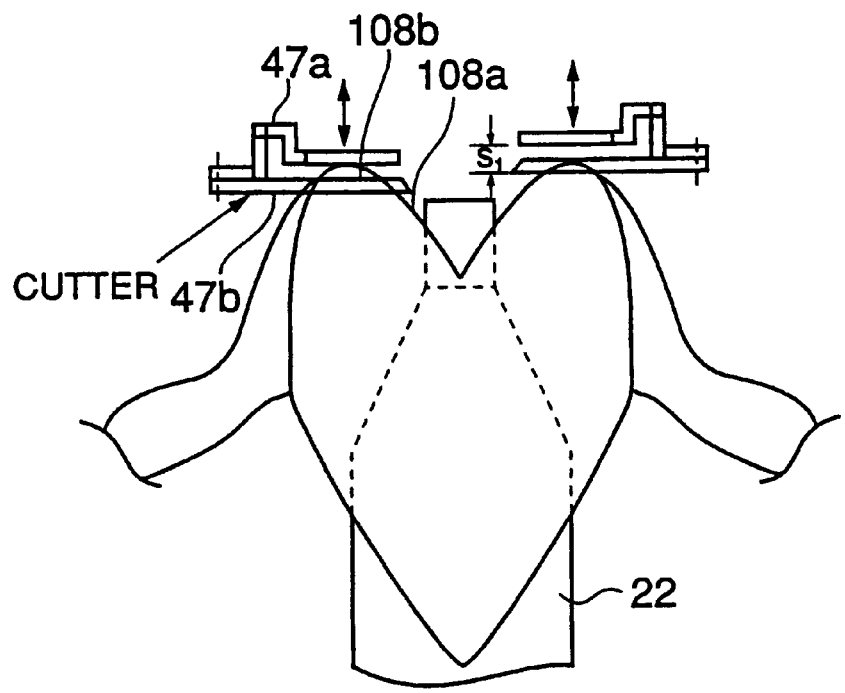
FIGS.7(A), 7(B) are schematic views showing a condition of shoulder portion cutting by a shoulder portion cutting section of FIG. 1, wherein FIG. 7A) is a front elevational view
Figure 7B:
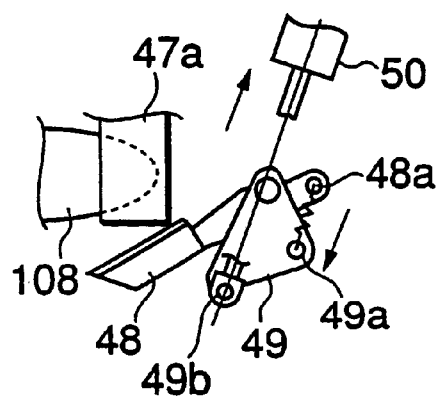

FIGS.7(A), 7(B) are schematic views showing a condition of forming an cut opening in the shoulder portion cutting by a shoulder portion cutting section 32b, wherein FIG. 7A) is a front elevational view and FIG. 7(B) is a view showing movement of a cutter as seen from above.

The operation is to form a cut opening in meat in the vicinity of each of both shoulders and the cut opening is useful for improving a recovery rate without occurrence of any tearing-off of the meat due to an effect of the cut opening as a starting point in stripping the meat. In the operation, the cut opening is required to form at a constant depth at a site 3 to 5 mm in distance from the top point of each of the shoulders.

As seen from the figure, press plates 47a, 47a with which both shoulders can separately pressed on the left and right sides, and moving plates 49, 49 and knife-like thin blades 48, 48 mounted on a structural member, not shown, on which the press plates 47a, 47a are also mounted, so as to be able to be rotatable about supporting points 49a, 49a are respectively included in different parallel planes, wherein a moving plate 49 and a thin blade 48 are spaced with a gap $S_1$ between both planes set in the range of 3 to 5 mm as described above.

When the thin blade 48 is put in contact with a bone, a pulling force of an air cylinder 50 is designed to act on the thin blade 48 by way of the moving plate 49 and the spring 48a in order to avoid undesirable cutting properly. Hence, a difference in individuality of works can be absorbed in the process.

Besides, since each of the press plates 47a, 47a presses one of both shoulders at a proper pressure which is independently determined all the time as described above, a difference in dimensions between the left and right side of a work can further be absorbed.

Figure 8A:
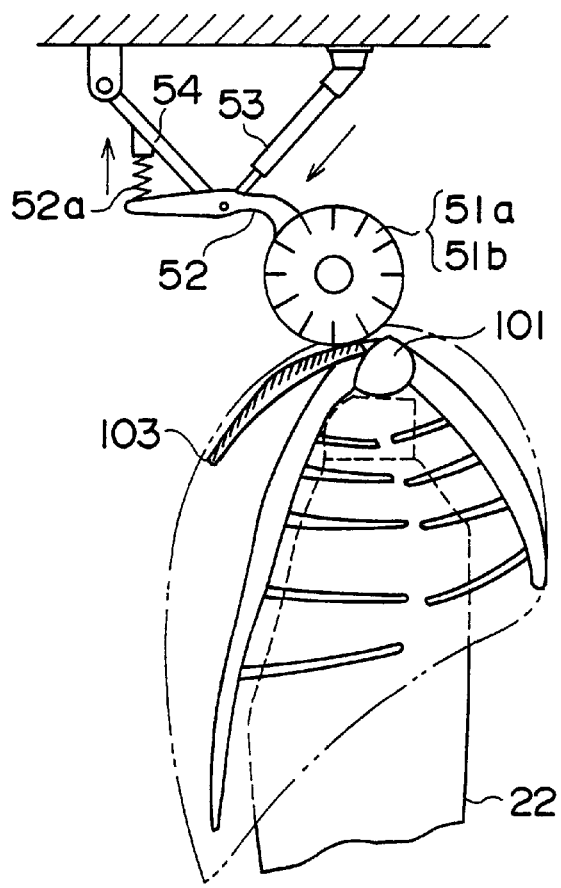
Figure 8B:
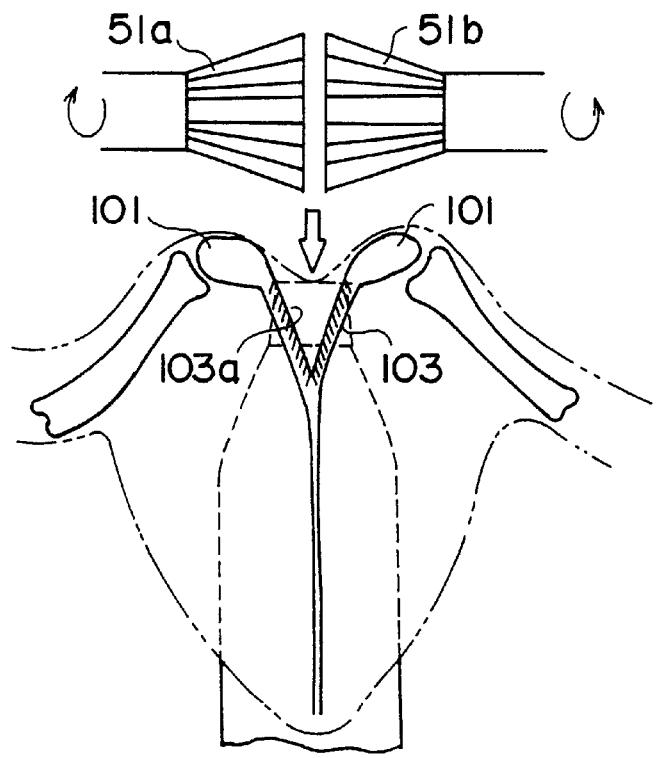

FIGS. 8(A), 8(B) are schematic views of a skelton system showing a forming condition of a cut opening for stripping meat around a furcula by the furcula portion cutting section 32c, wherein FIG. 8(A) is a side elevational view and FIG. 8(B) is a front elevational view.

The operation is to scrape meat and a membrane 103a on the surface of the furcula 103 by the turbine-runner like rollers and expose the furcula and when meat around the furcula is stripped, the cut opening is utilized to strip the meat as a starting point of stripping and deboning is thus performed with a good recovery rate.

As shown in FIG. 8(A), turbine-runner like rollers 51a, 51b each with a longitudinal section enlarged toward its one end are disposed above at the middle between both shoulders off to a side, each of the turbine-runner like rollers being rotatable independently from each other, left from right, and mounted to a link 52, which is supported by an arm 54 movable pivotably by an air cylinder 53, so as to be swingable downwardly at an angle toward the furcula 103a. Furthermore, an end of a spring 52a for pulling is attached to the other end of the link 52 and a pressing force on a proper scale thus acts on the surface of a furcula, whereby the operation of scraping can be performed with a good recovery rate.

Figure 9:
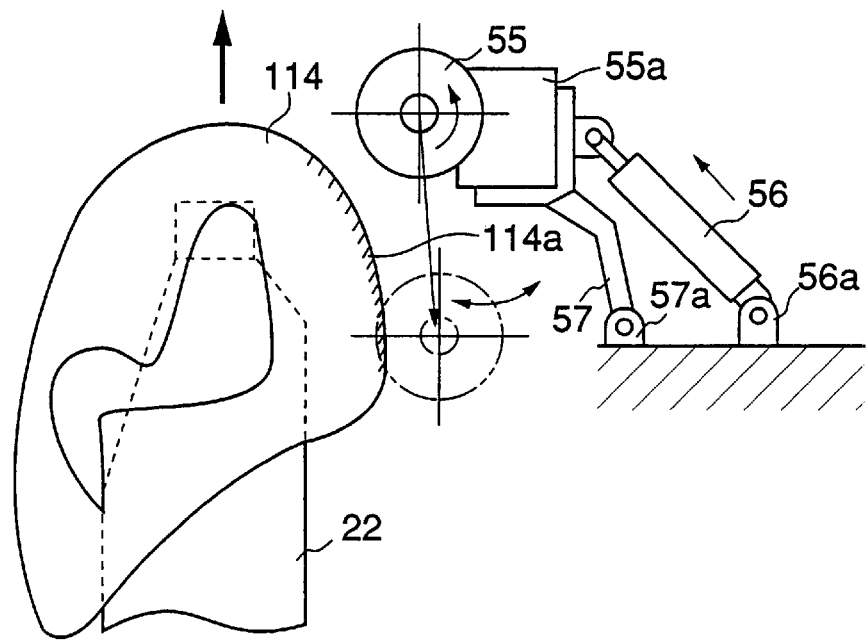
FIG. 9 is a schematic view showing a condition of back muscle cutting by a back muscle cutting section of FIG. 1.

FIG. 9 is a schematic view showing a condition of back muscle cutting by a back muscle cutting section 32c.

The operation is to form a cut opening along thoracic vertebrae in the central portion of the back 114 of a work and thereby meat and skin of the back 114 are easy to be separated between both sides of the cut opening as a boundary. In the operation, only cutting of skin and meat is required, and for this reason, as shown in the figure, a vertical rotary blade 55 in rotation is disposed in advance above a work a little off to a side when the work assumes a stop position prior to rise of a cone, wherein the blade 44 is driven by a drive section 55a which is supported by a support member 57 and a reduced pressure cylinder 56, the vertical rotary blade 55 is put in contact with the middle portion of the back 114 of the work 110 which is on the rise together with the cone 22 and a cut opening is formed in the meat portion with a proper depth and the skin portion under an adjusted pressure in the cylinder 56 so that a blade edge may not cut into the bulk to too a deep position.

Figure 10A:
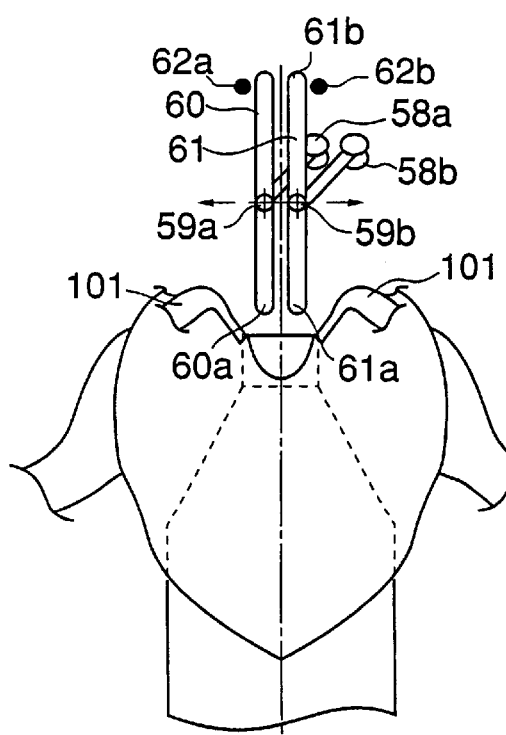
Figure 10B:
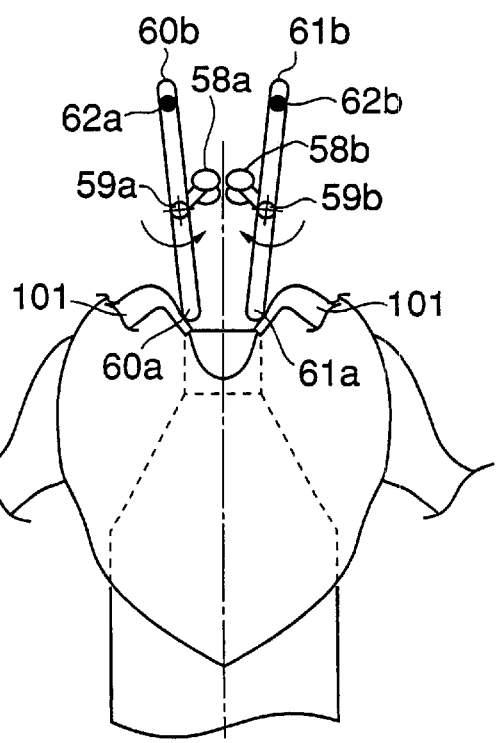

FIGS. 10A), 10(B) are schematic views showing a measuring condition by a measuring section 32d, wherein FIG. 10(A) is a view showing a condition before insertion of measuring bars and FIG. 10(B) is a view showing a condition in measurement.

The operation is to measure inner half widths between the scapula heads 101 of a work placed on the shoulder stoppers 22a of the cone 22 and prepare a dimensional reference for performing shoulder line-cutting and side portion line cutting to sever shoulder joints in the following steps, and for the reason, the measuring section 32d comprises: upright measuring bars 60, 61 which can respectively move leftward and rightward of a center line of the cone 22 which forms the center of a right facing position which, in turn, makes a work assume its right face position; drive sections 58a, 58b, which can move the measuring bars 60, 61 leftward and rightward respectively while supporting the measuring bars 60, 61 so as to be inclinable about supporting points 59a, 59b, and which can read and store its angle of rotation in movement of the bars 60, 61; and sensors 62a, 62b.

In the measuring, when the upright measuring bars 60, 61 are respectively moved leftward and rightward while keeping almost its upright positions by rotations, leftward and rightward, of the drive sections 58a, 58b, and the lower ends 60a, 61a thereof are put in contact with the insides of the left and right scapula heads 101, 101, the upright measuring bars 60, 61 are inclined so as to open upper ends 60b, 61b with the supporting points 59a, 59b as a centers of rotation. As a result, the upper ends 60b, 61b of the measuring bars activate the sensors 62a, 62b and the drive sections 58a, 58b stops their rotation to read angles of rotation and store the angle as shoulder width data.

Figure 11A:
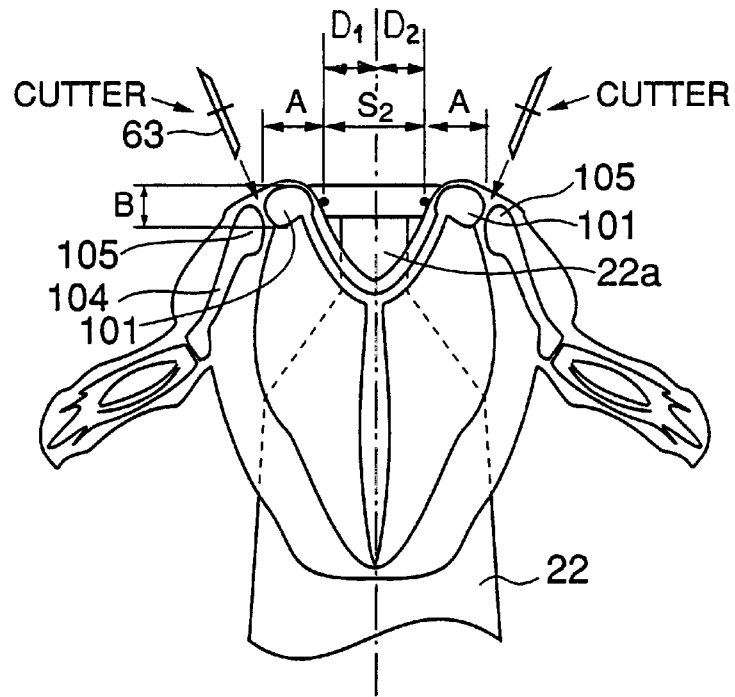
Figure 11B:
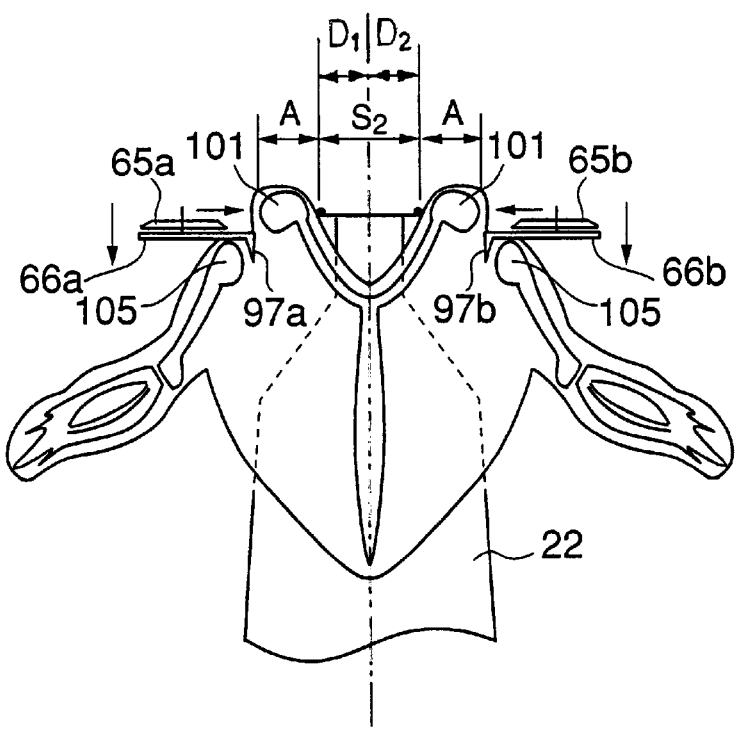

FIGS. 11(A), 11(B) are schematic views showing severing conditions of shoulder joints, wherein FIG. 11(A) shows a condition of shoulder line cutting and FIG. 11(B) is a view showing a condition of side portion cutting.

In the operation, the shoulder joint line-cutting section 33a comprises: a computing section for computing insert positions of oblique run cutters 63, 63 which are edged tools for severance of shoulder joints; drive sections for precisely positioning for the oblique run cutters 63; and the oscillating sections for horizontal cutters for the side portion cutting, wherein the severance with a high recovery rate is enabled, and severance of the outside tendons are firstly done by the shoulder line-cutting and thereafter, inward positioned tendons are severed in the side portion cutting section 33b.

Figures 19A, 19B:
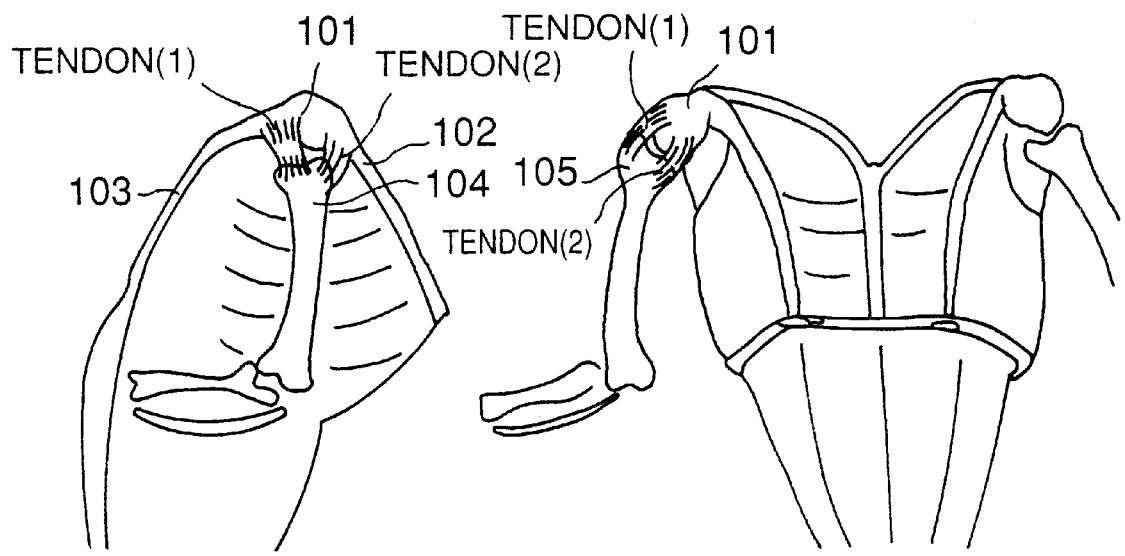
FIG. 19(A) is an enlarged side elevational view of a portion in a circle marked by D of a shoulder joint portion shown in FIG. 18(B) and FIG. 19(B) is an enlarged rear elevational view of a portion in a circle marked by E of a shoulder joint portion shown in FIG. 18(C).

The shoulder line-cutting is to cut organic tissue such as outward positioned tendons (tendons shown in FIGS. 19(A), 19(B)) which couples the outside of the scapula head 101 and the outside of the caput humeri 105 which is fittingly inserted in the glenoid 101a of the scapula head 101 and the oblique run cutters (rotary blade) 63, 63 are used as cutting edged tools, wherein the insert positions are respectively separately computed based on widths D1, D2 measured from the reference horizontal plane Y—Y and the center of a right facing position (the central line of a cone).

The insert position of the oblique run cutter 63 is set on an intersection line between a vertical plane and a horizontal plane in contact with the tops of the scapula heads 101, which is obtained at a height of a thickness B of a scapula head above the reference horizontal plane, the vertical plane including the outer side of a scapula head, left in the figure, which is determined through computation of a sum of a lateral distance D1, which is measured separately of the other, between an inner side of the left scapula head and the center of the work in the right facing position and a lateral width A of the left scapula head 101 or the outer side of the scapula head, right in the figure, which is determined through computation of a sum of a lateral distance D2, which is measured separately of the other, between an inner side of the right scapula head and the center of the work in the right facing position and a lateral width A of the right scapula head 101 and intersecting the right facing plane at a right angle thereto.

The insert directions of the oblique run cutters 63 are respectively in advance set so as to be directions open upward and forward off to the outside which included in planes which contact with inner engaging curved surfaces of the glenoids 101a of the scapula heads 101.

A computed value which is attained in consideration of a difference in individuality is used as a width A of a scapula head 101, while a fixed value is used as a thickness B.

With the above described construction, shoulder line cutting with a high recovery rate can be realized setting an accurate reference for cutting to absorb a difference in individuality of works.

The side portion cutting, which is performed after severance of the outward positioned tendons of shoulder joints, is enabled by the side portion cutting section 33b. The side portion cutting section 33b comprises: a computing section, not shown; horizontal press plates 66a, 66b; horizontal rotary cutters 65a, 65b, which can respectively be oscillated leftward and rightward and spaced above the horizontal plates 66a, 66b; and the cutter oscillating mechanism.

In the side portion cutting, inner end tip positions of the horizontal press plates 66a, 66b are set based on separately computed values which show the outside positions of the scapula heads relative to the center of the right facing position of a work, which are attained by measuring in the measuring section 32d, so that the tip ends assume positions at the outsides of the scapula heads. Then as the cone 22 is raised, the press plates 66a, 66b located above the caput humeris 105 whose outward positioned tendons have been cut off by the shoulder line-cutting section 33a are put in contact with the caput humeris 105. The caput humeris 105 are pushed down; downward protrusions 97a, 97b provided to the end tips of the plates 66a, 66b are respectively forced to intrude inside the caput humeris 105 and push down the wing side meat portion which are present outside of the shoulder joints; and finally the left side of the left scapula head 101 and the right side of the right scapula head 101 are both exposed out of the meat portion.

Insertion gaps for the horizontal rotary cutters 65a, 65b which are spaced above the press plates 66a, 66b are formed between the lower surfaces of the scapula heads 101 and the tops of the caput humeris 105, which enables a high recovery rate cutting of the inward positioned tendons which couple the scapula heads 101 and the caput humeris 105.

Figure 12A:
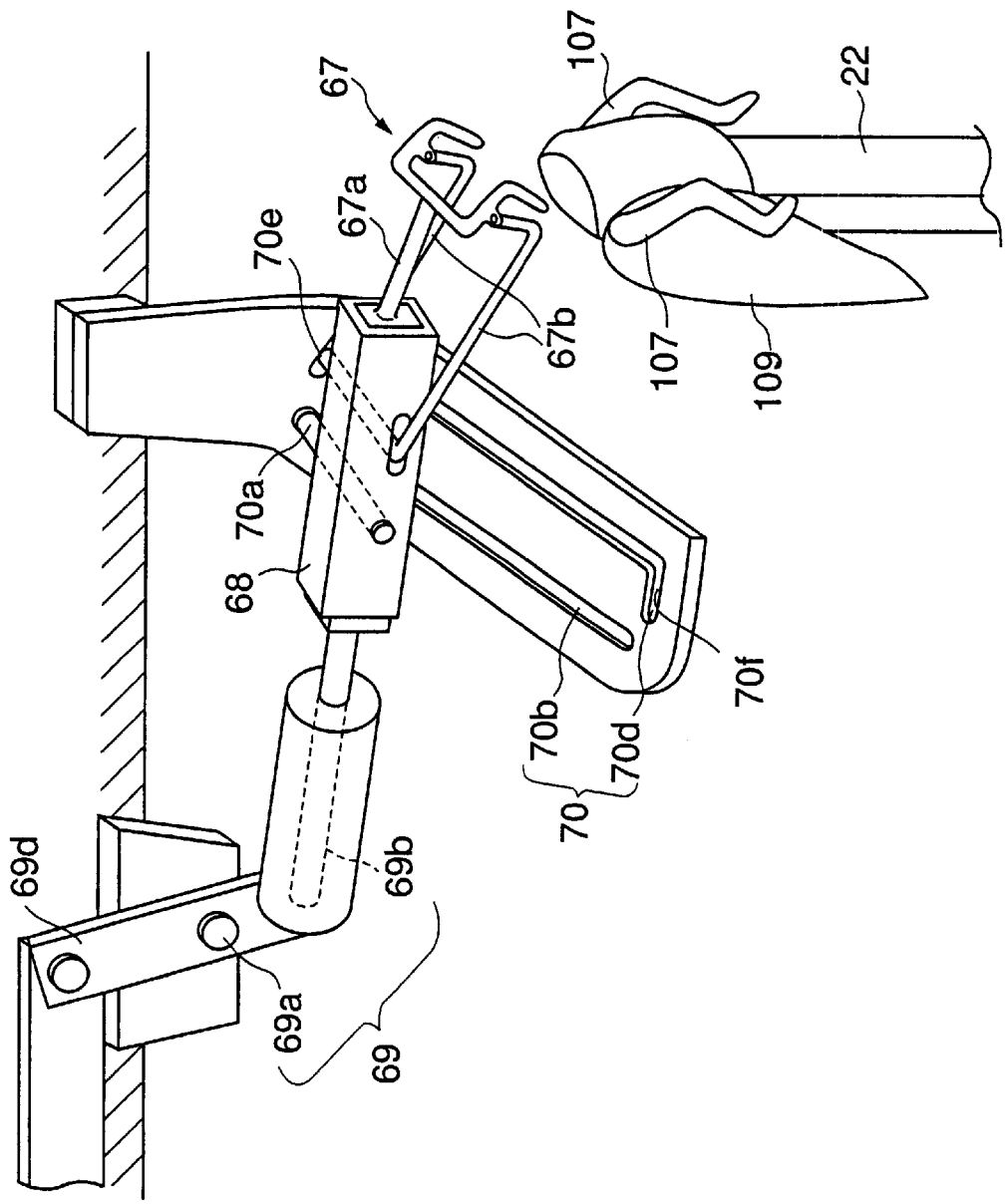
FIG. 12(A) is a schematic view showing a construction of a breast meat stripping mechanism in a breast meat stripping section of FIG. 1

FIG. 12(A) schematically shows a construction of a breast meat stripping mechanism in a breast meat stripping section 34 and FIG. 12(B) schematically shows a breast stripping operation. The breast meat stripping is performed in the steps of: grasping the left and right wings attached with the caput humeris 105, by a grasping mechanism, which have received the tendon cutting at the shoulder joints; and striping the wings together with the breast meat from a trunk skelton.

The breast meat stripping section 34, as shown in FIG. 12(A), comprises: a grasping mechanism 67 for grasping the left and right wings 107, 107 at the same time; a strip inclining mechanism 69; and a guide 70.

The grasping mechanism 67 comprises: a fixed claw 67a forked in two ways and a movable claws 67b which constitute the chuck; an open/close guide pin 70c and a chuck open/close guide 70d with curved portions 70e, 70f, which can make the chuck support a work pressing from both sides, wherein the left and right wings 107 are simultaneously supported being pressed from both sides in the first stage of inclining motion of the operating handle 69d, while the wings 107 can be released from the support in the final stage of the inclining motion.

The breast meat stripping section 34 further comprises: an incline sliding mechanism 69 which makes a chuck body 68, which fixedly supports the fixed claw 67a, contract or extend in an axial direction according to inclining motion of the operating handle 69d; a main guide pin 70a and a main guide 70b which control and determine a degree of sliding and a locus of the grasping mechanism 67, wherein the wings together with the breast meat can be stripped off from the work as the operating handle 69d is progressively inclined. As seen from FIG. 12(B), an inclination direction D (about 30 to 60 degrees) of the guide mechanism 70 constructed of the main guide 70b which guides the stripped breast meat 109 linearly and the chuck open/close guide 70d is properly set and the breast meat 109 accompanying the wings 107 can, thereby, be prevented from small pieces of cartilage stuck in the breast meat and contamination such as mixing due to contact of the breast meat 109 with ribs.

The operating arm 69d of the inclining mechanism 69 is inclined about a rotary supporting point 69a, as a center, provided on the structure and the chuck body 68 is thereby contracted or extended with the help of a linear sliding section 69b which lying therebetween.

Figure 13A:
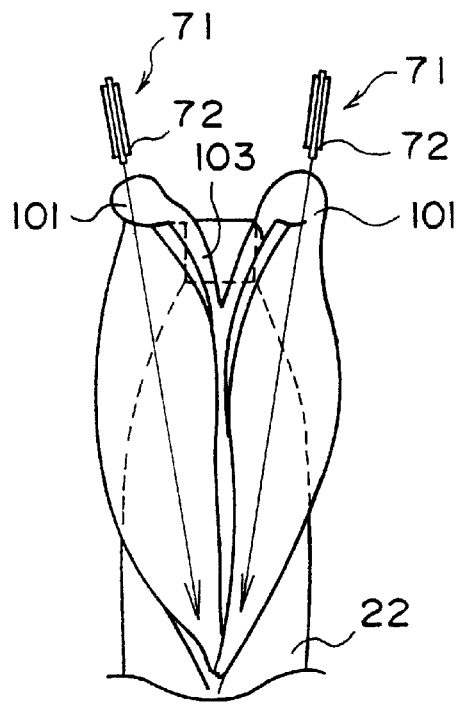
Figure 13C:
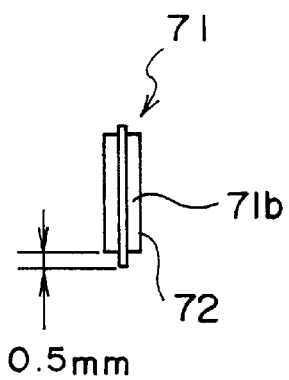
Figure 13B:
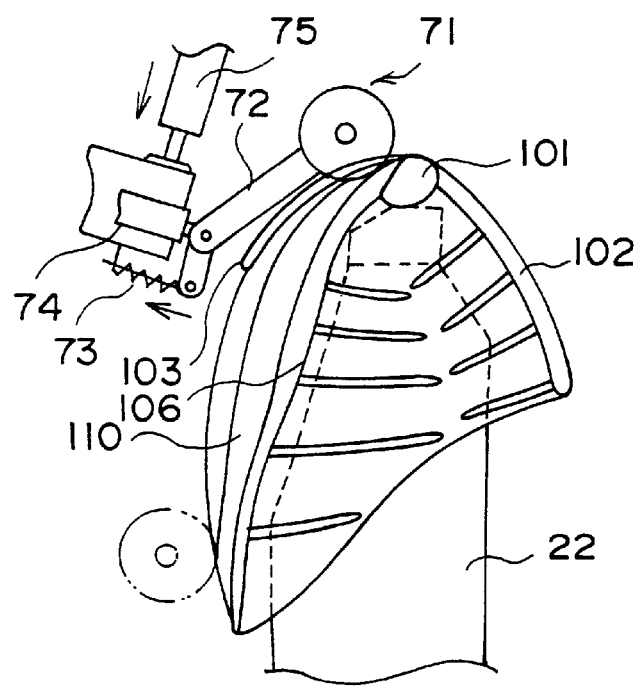

FIGS. 13(A), 13(B) are schematic views showing a condition of white meat line cutting by a white meat line cutting section 35a, wherein FIG. 13(A) shows a front elevational view and FIG. 13(B) shows a side elevational view.

The operation is a preliminary process for the white meat removing which is conducted in the next step and in the operation, a cut opening in a thin membrane covering the white meat is formed, wherein the white meat line cutting section 35 comprises: vertical rotary cutters 71, 71; a lever 72 which freely inclines the cutters 71and can press the work through a spring 73; an actuator 74 which advances an inclination supporting point of the lever 72; and an air actuator 75 which works the supporting point to be lowered.

With the above described construction, when line cutting is conducted, the cutter 71, at first, is advanced by the air actuator 74 to be put in contact with the work and start line cutting, and then, the cutter 71 is shifted downward by the air actuator 75. Thereby, the cutter 71 is moved along the white meat from the neck side toward the lower half body, which forms two line cuttings 110 on the left and right sides while a thin membrane portion of the white meat is cut, which are shown in FIGS. 13(A), 13(B), since a blade edge of 0.5 mm in width inwardly from the edge is exposed while the rest of the blade is covered by a guide 71, as shown in a cutter structure of FIG. 13(C).

In the construction, the spring 73 absorbs a difference in individuality of works with the help of a proper tension urged by the spring action.

Figure 14:
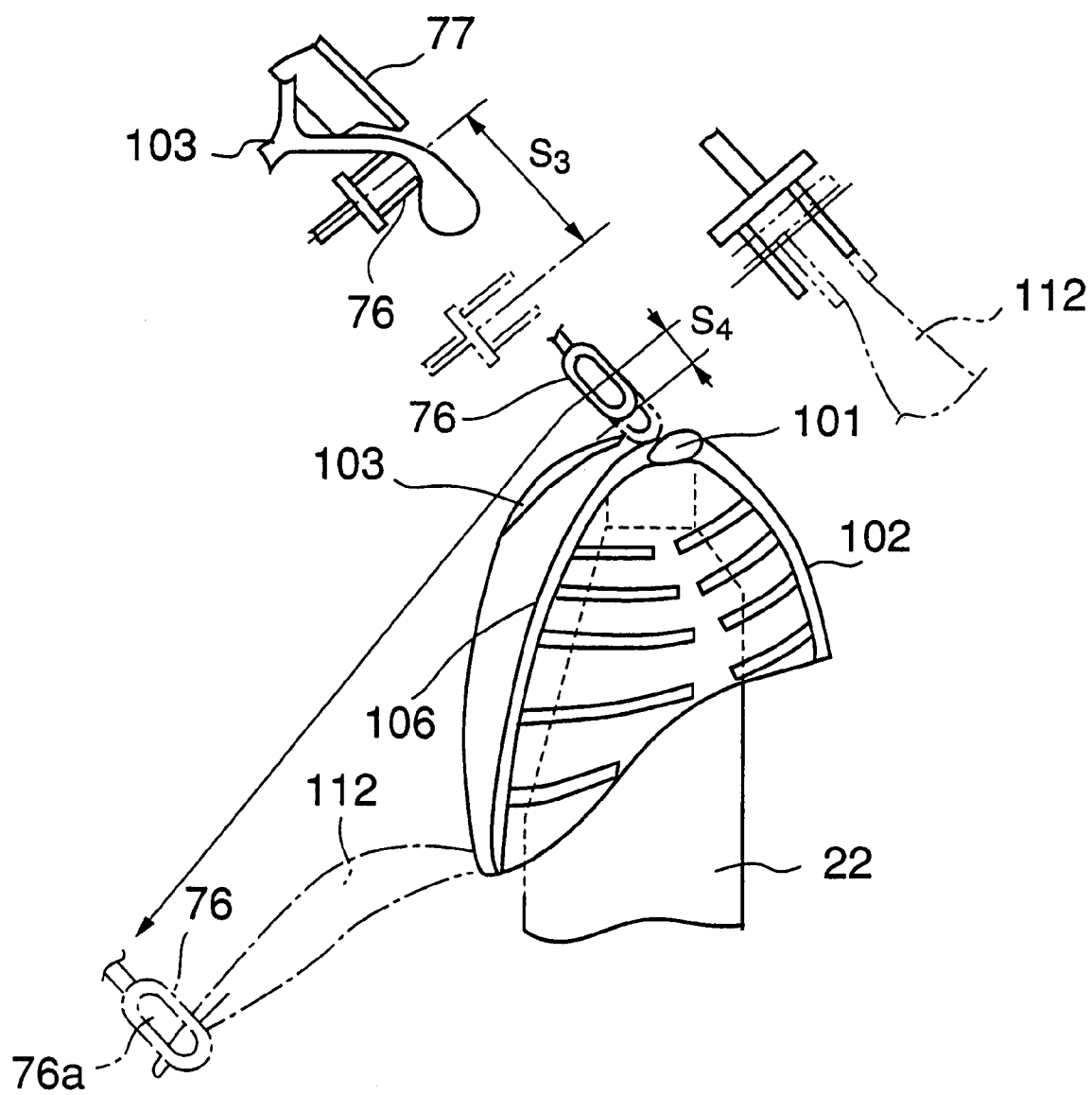
FIG. 14 is a schematic representation showing a white meat removing operation by the white meat removing section of FIG. 1.

FIG. 14 is a schematic representation showing a white meat removal operation by a white meat removing section 35b, which comprises: two chucks which are disposed on the left and right side of the work in such a manner that the two chucks are a little deviated from each other in translating directions; a furcula pressing mechanism which moves the chucks toward each other from both sides to the center and thereby pushing away a furcula; a chuck advancing mechanism for grasping an end tip of the furcula; an air actuator for moving down the grasped white meat; and an angle member which fixes the top portion of the skelton.

In the white meat removal, the cone 22 is raised so that the scapula heads 101 which is the top of the skelton are put in contact with the angle member 77 and then the skelton top is held fast.

Then, the two-way forked ends of the chucks 76 are inwardly moved by a distance S3 to push away the furcula 103. Then, the ends of the chucks 76 are advanced by a distance S4, so that the end tips of the white meat 112 are respectively grasped, being fast held between the two way forked ends of the chucks, and the white meat 112 can then be stripped from the neck side toward the lower half body by the air actuator.

Grasping faces of the two-way forked ends 76 of each of the chucks are provided with a through-hole portion or recesses and protrusions in order to prevent slippage from occurring and thereby enable sure grasping.

Figure 15:
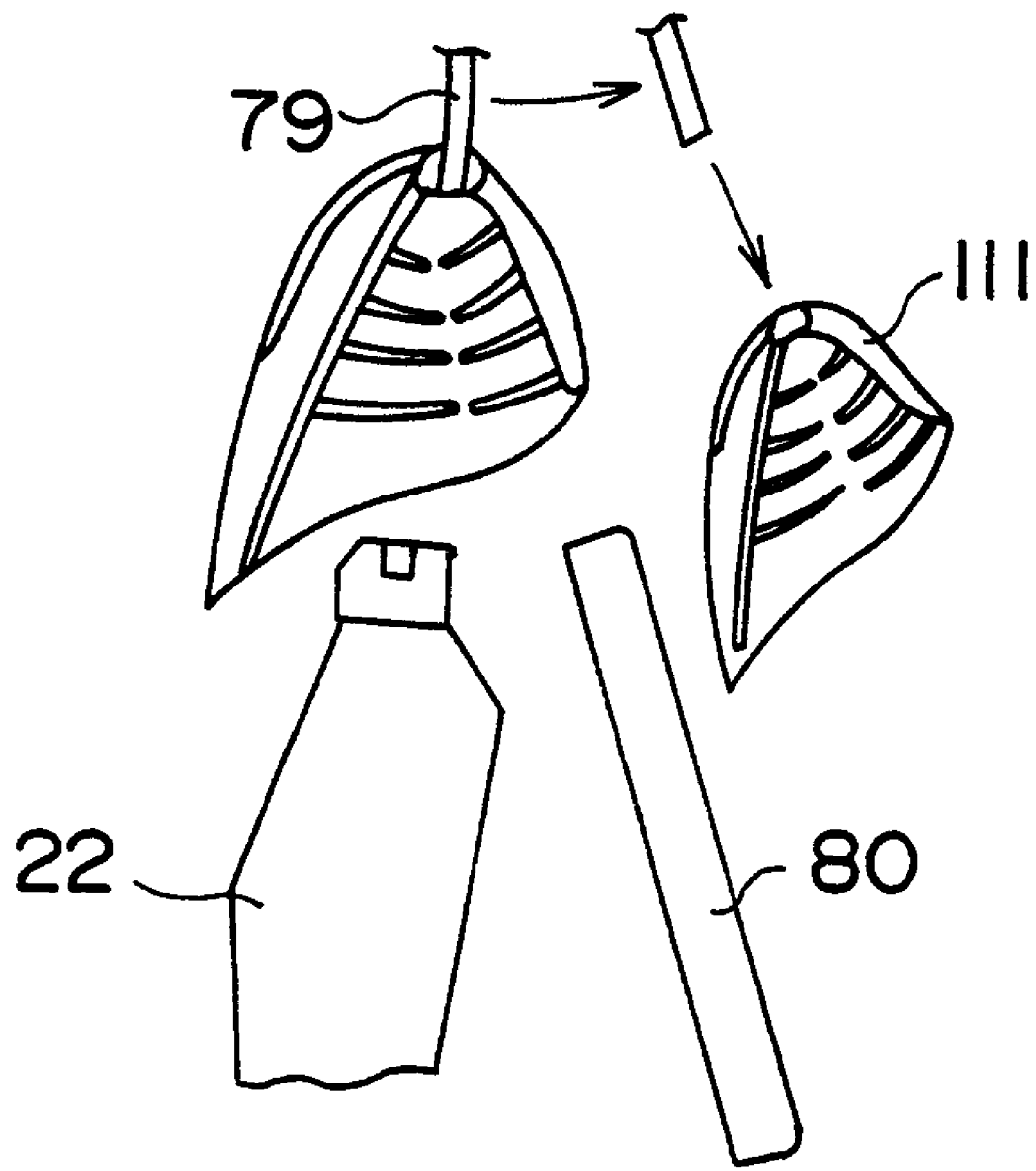
FIG. 15 is a schematic representation showing a skelton discharging operation by a skelton discharging section of FIG. 1.
Figure 16:
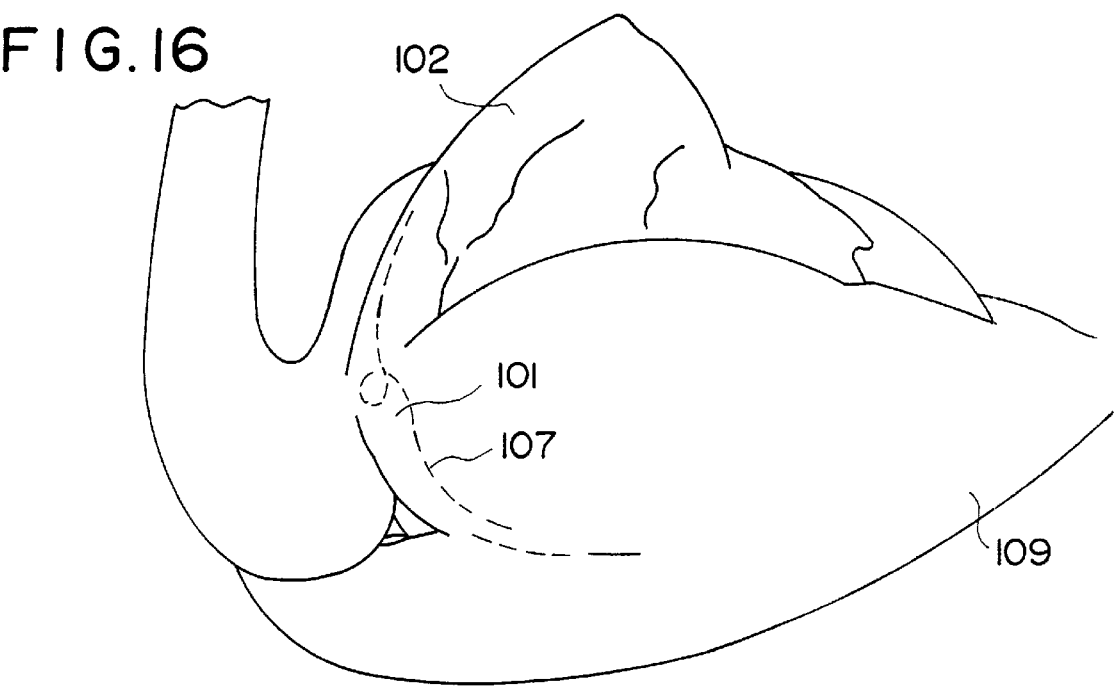
FIG. 16 is a perspective view of an upper half of a poultry carcass.
Figure 17:
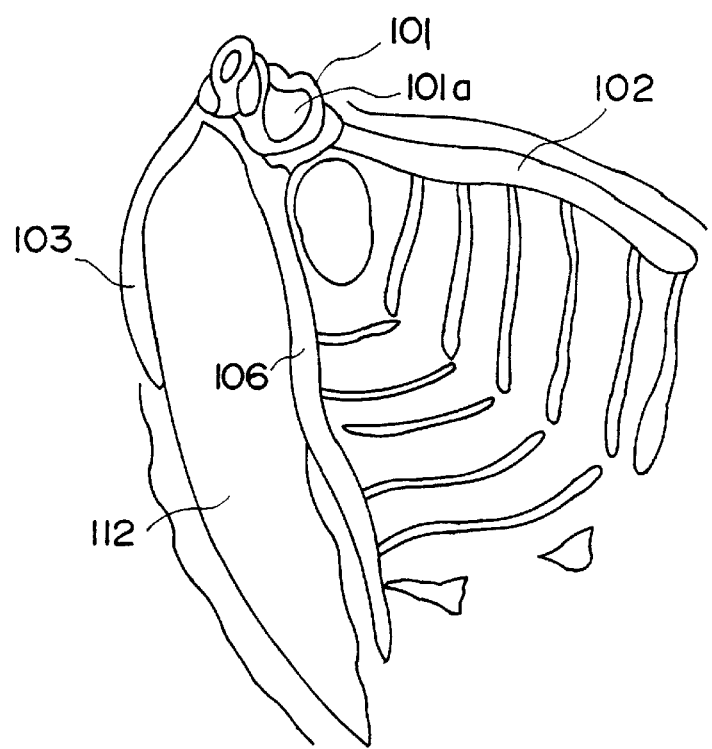
FIG. 17 is a view of a skelton system configuration after wings together with breast meat are stripped from the upper half of poultry carcass of FIG. 16.
Figures 18A, 18B, 18C:
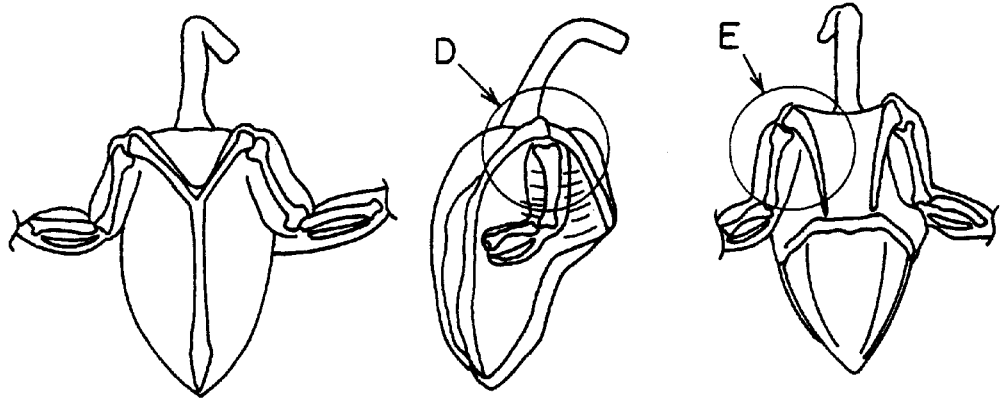

FIG. 15 is a schematic representation showing a skelton discharging operation by a skelton discharging section 36, which comprises: a grasping mechanism 79; an oscillating mechanism, not shown, of the grasping mechanism 79; and a chute 80.

In the skelton discharging operation, the skelton 111 are raised to a specified position while being inserted by the cone 22 and the claw 24, which has actually fixed the skelton 111, for fixing a work in its right facing position is released from the locking state by engagement with the cam plate 24b and inclusion into the cone 22 as the skelton is raised. The top of the skelton 111 which is ready for removal being leased from the locking is grasped using the grasping mechanism 79 and the skelton 111 is removed from the cone 22 by shifting down the cone 22. Then, the direction of the skelton grasped by the oscillating mechanism is adjusted so as to align toward the chute 80 and then the skelton is discharged.

With the above described construction, in deboning the upper half of a poultry carcass, there are provided an automatic deboning method and apparatus for an upper half of a poultry carcass which enables not only perfect prevention of a foreign matter from mixing which is required for food but perfectly unmanned operation with a high recovery rate, wherein the deboning of the upper half of a poultry carcass is divided into a plurality of steps of: work feeding/mounting; a preliminary process; shoulder joint severing; breast meat stripping using wings; white meat line-cutting; and skelton discharging, wherein:

in the work feeding/mounting step, setting of a reference horizontal plane, a right facing plane and the center of a right facing position which are required for deboning of a work are performed;

in the preliminary process step, measuring/storing processing is performed which mainly measures half widths between the center of a work in its right facing position and the inner sides of scapula heads for securing deboning processing with a high recovery rate while absorbing differences in individuality of works such as in the size of a work and imbalance between the left and right sides and processings for forming a cut opening such as shoulder skin stripping, shoulder portion cutting, furcula portion cutting and the like are performed;

in the shoulder joint severing step, shoulder joint severing is performed without meat cutting while performing computation based on measured values including the differences in individuality of works for cutting organic tissue composed mainly of tendons of a shoulder joint, which is a precondition for breast meat stripping in a later stage;

in the breast stripping step, mixing of foreign matter such as small pieces of cartilage into a meat portion is prevented for occurring by introduction of linear guiding of the breast meat in the course of the breast stripping; and in the white meat removing step, white meat removal is performed with a high recovery rate while any tearing off of meat is prevented, taking advantage of a cut opening formed in a thin membrane covering the white meat by the white meat line-cutting and a cut opening around the furcula formed by furcula portion cutting in the preliminary process step, and in the breast stripping step, the step is branched in its later stage to the breast meat severing step.

We claim:

1. An automatic deboning method for an upper half of a poultry carcass, comprising a series of the steps of: feeding and mounting a work which is an upper half of a poultry carcass; performing a preliminary process on the mounted work; severing a shoulder joint of the work which has been subjected to the preliminary process; then stripping breast meat; subsequently removing white meat; and then discharging a skelton, wherein in the step of feeding/mounting a work, the lower surfaces of scapula heads of shoulder joints of the work are set on a reference horizontal plane and the work is fixed so as to assume a right facing direction;

in the preliminary process step, a measuring/storage step for measuring on specific portions of the work in a width direction thereof in order to automatically cope with individuality of the work is provided;

in the step of severing a shoulder joint, a cutter insert position in cutting of outward positioned tendons, leftward/rightward movement positions of both end tips of a caput humeri press plates in cutting of inward positioned tendons, and a horizontal cutter insert position are computed and set based on the measured value;

in the step of stripping breast meat, a step of severing breast is provided for separating the breast meat as a branched step of the breast meat stripping step, and wherein the whole steps constitute a circulation system, in which process flow is automatically returned back to the work feeding/mounting step after the skelton discharging step is completed.

2. An automatic deboning method for an upper half of a poultry carcass according to claim 1, wherein the work mounting is performed in a manner such that the lower surfaces of scapulas heads of both shoulders are set on a reference horizontal plane, the right facing direction is set by adjusting positions of the bases of the wings and then the set conditions are fixedly maintained from the mounting through completion of the whole deboning process.

3. An automatic deboning method for an upper half of a poultry carcass according to claim 1, wherein the measurement on specific portions is to measure distances between the inner sides of the scapula heads of both shoulders and the work center in a right facing position in which individuality of each work is conspicuously revealed and the measurement is carried out under conditions that the lower surfaces of the scapula heads are set on a reference horizontal plane and at the same time the work is set in the right facing direction, which are not disturbed unstable.

4. An automatic deboning method for an upper half of a poultry carcass according to claim 1, wherein the insert position of an oblique run cutter in the cutting outward positioned tendons is set when the lower surfaces of scapula heads are set on the reference horizontal plane and the work is fixed in the right facing direction;

wherein the insert position is set on an intersection line between a vertical plane and a horizontal plane in contact with the tops of the scapula heads, the vertical plane including the outer side of a left or right scapula head which is determined through computation of a sum of a lateral distance between an inner side of the left scapula head and the center of the work in the right facing position and a lateral width of the left scapula head or the outer side of the right scapula head which is determined through computation of a sum of a lateral distance between an inner side of the right scapula head and the center of the work in the right facing position and a lateral width of the right scapula head and intersecting the right facing plane at a right angle thereto; and wherein an insert angle of the oblique run cutter is set in such a manner that the cutter can contact with an engaging face of the glenoid of the scapula, in which the caput humeri is engaged, and which is open upward and forward off to the left side or right side, so that cutting of the outward positioned tendons can be realized.

5. An automatic deboning method for an upper half of a poultry carcass according to claim 1, wherein the leftward/rightward movement positions of both end tips of caput humeri press plates in cutting of inward positioned tendons are set on the vertical plane, which has been computed in claim 4, including the outer side of a scapula head and intersecting the right facing plane at a right angle thereto; and wherein the caput humeris are pressed down by rise of the work and gaps into which the horizontal cutter can be inserted are formed between the lower surfaces of the scapula heads in which the glenoids are included and the tops of the caput humeris, whereby the cutting of the inward positioned tendons is enabled.

6. An automatic deboning method for an upper half of a poultry carcass according to claim 1, wherein in the preliminary process step, a shoulder skin stripping section, a shoulder portion cutting section, a furcula portion cutting section and a back muscle cutting section are provided, whereby a cut opening in meat around the tops of both shoulders, a cut opening in meat around the furcula and a cut opening in the back muscle can be formed.

7. An automatic deboning method for an upper half of a poultry carcass according to claim 1, wherein the white meat removing step includes a white meat line-cutting step of forming a cut opening by conducting line cutting in a membrane covering the white meat in the preceding stage.

8. An automatic deboning method for an upper half of a poultry carcass according to claim 1, wherein the breast meat severing step is provided with: a transfer section on which breast meat is held while being hanged by hooking end tips of humeruses of wings stripped in the breast meat stripping step at outsides of respective two conveyors running in parallel; a horizontal support section for horizontally supporting the humeruses, left and right, by a grasping mechanism; a one side cutting section for horizontally cutting, from one side, a juncture between a humerus horizontally held and the breast meat; a rotary section for rotating the humeruses by the grasping mechanism through 180 degrees; and an other side cutting section for horizontally cutting the other side of the juncture which has been turned.

9. An automatic deboning apparatus for an upper half of a poultry carcass including a plurality of stations respectively provided with a work feeding/mounting section, a preliminary process section, a shoulder joint severing section, a breast meat stripping section, a white meat removing section, and a skelton discharging section, wherein a work is subjected to a tact transport through the stations so as to move from one station to the next after desired processing in the one station is completed while being fixedly supported, so that deboning is completed, the apparatus comprising: a group of stations, which are arranged as in a wheel, and in which the processing sections are respectively equipped in the written order; a main tact transport of a circulation type in which desired deboning processing is performed while the work is supported and moved station by station; an auxiliary tact transport for breast meat severance which connects with a station equipped with the breast meat stripping section; and a group of stations accompanying the auxiliary tact transport;

wherein a station equipped with the work feeding/mounting section has a setting function for a reference plane and a right facing plane necessary for a deboning process;

a group of stations equipped with the preliminary process section comprises a station equipped with an automatic work measuring/storage section;

a group of stations equipped with the shoulder joint severing section compute and use data formed by the measuring/storage section; and the group of stations accompanying the auxiliary tact transport comprises a wing transfer section, a humerus horizontal support section, a one side cutting section, and an other side cutting section.

10. An automatic deboning apparatus for an upper half of a poultry carcass according to claim 9, wherein the main tact transport comprises: a mounting table on which the work advances station by station in a stepwise manner with specified angular intervals to travel from one station to the next after stoppage at the one station and completion of specified processing on the work within a specified time, a cyclic movement of a stepwise advance, stoppage, deboning related processing, and the next stepwise advance is repeated so that the work as a result of the cyclic movement is returned back to a station provided with the work feeding/mounting section at its starting position; a plurality of cones provided on the table, each of which makes the work face outwardly in a radial direction so as to assume a right facing position; and a drive mechanism which enables stoppage at specified positions and tact transport.

11. An automatic deboning apparatus for an upper half of a poultry carcass according to claim 10, wherein the cycle movement is a cyclic movement constituted of a stepwise advance, stoppage, table rise, deboning related processing, table lowering, the next stepwise advance, and wherein the main tact transport further comprises a vertical shift mechanism whereby position control and speed control are enabled.

12. An automatic deboning apparatus for an upper half of a poultry carcass according to claim 10, wherein the cones assume respective right facing positions to face outward in radial directions at respective angular positions along the circumference divided at angular intervals each corresponding to a stepwise advance; shoulder stoppers for setting the work on a specified reference horizontal plane are provided at the top of each of the cones; wing supports for setting the work in a right facing direction are provided on both sides thereof; and a claw which is used for fixing the work in the right facing position by pressing the inserted work from the inside thereof, wherein the claw, which is used for fixing the work in the right facing position, enables a skelton to be discharged and a work to be fed and mounted being released from a fixing state by engagement with a fixed cam plate when the mounting table is raised in stations respectively provided with the work feeding/mounting section and the skelton discharging section, whereas the fixing state is maintained in the other following stations.

13. An automatic deboning apparatus for an upper half of a poultry carcass according to claim 9, wherein the group of stations provided with the preliminary process section comprises: a station provided with a shoulder skin stripping section; a station provided with a shoulder portion cutting section; and a station provided with a furcula portion cutting section and a back muscle cutting section.

14. An automatic deboning apparatus for an upper half of a poultry carcass according to claim 9, wherein a station provided with the measuring/storage section is disposed after a station provided with the furcula portion cutting section and the back muscle cutting section, and the measuring section comprises: leftward/rightward inclination detecting bars, which are inserted inside the scapula heads which are set on the reference horizontal plane, and each of which is inclinable separately leftward or rightward with respect to the center of the work in its right facing position; a sensor for sensing an inclination of each detecting bar; and two control motors each with a memory for outward movement, separately leftward or rightward, of the bar.

15. An automatic deboning apparatus for an upper half of a poultry carcass according to claim 9, wherein the group of stations equipped with the shoulder joint severing section is a group of stations equipped with a shoulder line-cutting section and a side portion cutting section.

16. An automatic deboning apparatus for an upper half of a poultry carcass according to claim 15, wherein a station equipped with a shoulder line-cutting section comprises: a cutter insert position computing section; and an oblique run cutter, with a control mechanism, which is positioned based on a pair of separately measured values on the left and right sides and which moves symmetrically to the left and right sides.

17. An automatic deboning apparatus for an upper half of a poultry carcass according to claim 15, wherein a station including the side portion cutting section comprises: a computing section for computing movement positions, leftward and rightward, of end tips of a horizontal press plates which press down the caput humeris; a pair of horizontally oscillating rotary cutters, left and right, moving inward separately on the left and right sides; and the press plates respectively with downward pointed protrusions at end tips, disposed in a spaced manner under the cutters.

18. An automatic deboning apparatus for an upper half of a poultry carcass according to claim 9, wherein a station equipped with the breast meat stripping section comprises: a chuck for holding wings, left and right, pressing from both sides; a guide mechanism for guiding the chuck, which holds the wings, linearly in a direction downward at a specified angle; and an actuator for movement.

19. An automatic deboning apparatus for an upper half of a poultry carcass according to claim 9, wherein a station provided with a white meat removing section comprises a station which is provided with a white meat line-cutting section in the preceding stage, wherein the station which is provided with the white meat line-cutting section includes a unit which enable two line-cuttings, and the unit comprises: a cutter mechanism which enables a cut opening in membrane tissue to be formed, performing cutting of the membrane tissue only; a press mechanism of the cutter; and a cutter run mechanism in a direction, downward off to a side.

20. An automatic deboning apparatus for an upper half of a poultry carcass according to claim 9, wherein a station provided with the white meat removing section comprises: a pair of chucks which secure strong grasping; a grasping mechanism for grasping an end of white meat by end tips of a chuck while pushing away a furcula; a linear guide stripping mechanism for stripping grasped white meat in a direction, downward off to the front side; and a movement preventing member for a skelton end portion which is provided above the top of the skelton so as to be able to be put in contact with the skelton, wherein the grasping mechanism is provided with recesses and protrusions or a long hole opening on grasping surfaces.

21. An automatic deboning apparatus for an upper half of a poultry carcass according to claim 9, wherein a station provided with the skelton discharging section comprises: a fixed cam plate which releases a work from a fixing state by retreating a claw which is used for fixing the work in the right facing position; a robot hand which freely opens and closes for discharging a skelton; and an oscillate discharging mechanism for discharging a grasped skelton to a chute.

22. An automatic deboning apparatus for an upper half of a poultry carcass according to claim 9, wherein the auxiliary tact transport comprises: parallel run conveyors; a grasp rotary mechanism; and a horizontal cutter which can oscillate leftward and rightward, and further comprises: a transfer section for receiving wings together with breast meat from the main tact transport and transferring them to the parallel run conveyors in a hanging condition; a horizontal support section for humeruses; a one side cutting section for forming a cut opening between a humerus supported and breast meat; and an other side cutting section for forming a cut opening on the other side of the work, which has been reversed by rotation and, whereby the breast meat can be severed.

* * * * *